(12) United States Patent
Arakane

(10) Patent No.: US 10,434,806 B2
(45) Date of Patent: Oct. 8, 2019

(54) INKJET PRINTER

(71) Applicant: Brother Kogyo Kabushiki Kaisha, Nagoya-shi, Aichi-ken (JP)

(72) Inventor: Satoru Arakane, Nagoya (JP)

(73) Assignee: Brother Kogyo Kabusiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/933,476

(22) Filed: Mar. 23, 2018

(65) Prior Publication Data

US 2019/0030934 A1     Jan. 31, 2019

(30) Foreign Application Priority Data

Jul. 28, 2017 (JP) ................................ 2017-146082

(51) Int. Cl.

| | | |
|---|---|---|
| *B41J 29/38* | (2006.01) | |
| *B41J 2/175* | (2006.01) | |
| *H04N 1/23* | (2006.01) | |
| *B41J 29/13* | (2006.01) | |

(52) U.S. Cl.
CPC ........... *B41J 29/38* (2013.01); *B41J 2/17509* (2013.01); *B41J 2/17533* (2013.01); *B41J 2/17546* (2013.01); *B41J 2/17553* (2013.01); *B41J 29/13* (2013.01); *H04N 1/233* (2013.01); *H04N 2201/0093* (2013.01)

(58) Field of Classification Search
CPC .................................................. B41J 2/17509
See application file for complete search history.

(56) References Cited

U.S. PATENT DOCUMENTS

| | | | |
|---|---|---|---|
| 6,971,732 B1* | 12/2005 | Seshimo | B41J 2/17513 347/19 |
| 7,916,314 B2 | 3/2011 | Matsumoto | |
| 8,186,802 B2 | 5/2012 | Sakurai | |
| 2006/0146082 A1* | 7/2006 | Nunokawa | B41J 2/2103 347/15 |
| 2006/0150833 A1* | 7/2006 | Iwamoto | B41J 2/17546 101/116 |
| 2008/0204485 A1 | 8/2008 | Matsumoto | |

(Continued)

FOREIGN PATENT DOCUMENTS

| | | |
|---|---|---|
| JP | H06-183032 A | 7/1994 |
| JP | 2002-001935 A | 1/2002 |

(Continued)

*Primary Examiner* — Shelby L Fidler
(74) *Attorney, Agent, or Firm* — Banner & Witcoff, Ltd.

(57) ABSTRACT

An inkjet printer includes an inkjet head having a first nozzle for ejecting first ink supplied from a first tank and a second nozzle for ejecting second ink supplied from a second tank, and a controller. The controller determine whether a replenishment condition is satisfied. When print data instructing to print with the first ink is received, in a case of determining that the replenishment condition is not satisfied, the controller causes the inkjet head to perform a first ejecting operation of ejecting ink from the first nozzle toward a medium and prohibiting ejection of ink from the second nozzle. When print data instructing to print with the first ink is received, in a case of determining that the replenishment condition is satisfied, the controller causes the inkjet head to perform a second ejecting operation of ejecting ink from at least the second nozzle toward a medium.

19 Claims, 15 Drawing Sheets

(56) References Cited

U.S. PATENT DOCUMENTS

| | | | |
|---|---|---|---|
| 2010/0238208 A1 | 9/2010 | Sakurai | |
| 2011/0001770 A1* | 1/2011 | Giles | B41J 2/1752 347/6 |
| 2012/0026545 A1* | 2/2012 | Miura | G06F 3/121 358/1.15 |
| 2015/0298461 A1* | 10/2015 | Koganehira | B41J 2/17509 347/7 |

FOREIGN PATENT DOCUMENTS

| | | |
|---|---|---|
| JP | 2008-207417 A | 9/2008 |
| JP | 5229030 B2 | 7/2013 |
| JP | 2016-190402 A | 11/2016 |

* cited by examiner

INKJET PRINTER

CROSS-REFERENCE TO RELATED APPLICATION

This application claims priority from Japanese Patent Application No. 2017-146082 filed on Jul. 28, 2017, the entire subject-matter of which is incorporated herein by reference.

TECHNICAL FIELD

The present invention relates to an inkjet printer for performing printing by ejecting ink from nozzles.

BACKGROUND

There has been disclosed an inkjet recording apparatus for performing printing by ejecting ink, as an example of inkjet printers. The related-art inkjet recording apparatus has ink tanks connected to an inkjet head. The ink tanks have ink replenishment inlets for replenishing with ink. It is possible to supplying ink into the ink tanks through the ink supply inlets.

In the related-art inkjet recording apparatus, when replenishing ink through an ink replenishment inlet, a user may pour ink having physical properties different from those of ink contained in the corresponding ink tank, by mistake. When such a mistake occurs, in the ink tank, the ink having different physical properties intermixes. Therefore, the ink may flocculate. When the ink flocculate, it may become impossible to eject the ink.

Even in the case of adopting a configuration in which ink is supplied from ink cartridges, not from ink tanks having ink replenishment inlets, when a user replace an ink cartridge, when the user installs an ink cartridge containing ink having physical properties different from those of ink contained in the ink cartridge having been used until then, by mistake, a problem as described above may occur.

Especially, in the case where the user cannot manage data which is the source of print data, even though discharge of the flocculated ink or the like is performed such that printing becomes possible, it is impossible to perform re-printing on the basis of the corresponding print data.

SUMMARY

The specification discloses an inkjet printer capable of preventing printing of images from being impossible in the case where there is a possibility that ink contained in an inkjet head is in a flocculated state.

One illustrative aspect provides an inkjet printer having:
an inkjet head having a first nozzle for ejecting first ink supplied from a first tank and a second nozzle for ejecting second ink different from the first ink, the second ink supplied from a second tank;
a first passage that fluidly connects the first nozzle and the first tank:
a second passage that fluidly connects the second nozzle and the second tank; and
a controller,
wherein the controller is configured to:
determine whether a replenishment condition related to replenishment of at least one of the first tank and the first passage with ink having physical properties different from those of the first ink is satisfied;
when print data instructing to print with the first ink is received, in a case of determining that the replenishment condition is not satisfied, cause the inkjet head to perform a first ejecting operation of ejecting ink from the first nozzle toward a medium and prohibiting ejection of ink from the second nozzle toward a medium; and
when print data instructing to print with the first ink is received, in a case of determining that the replenishment condition is satisfied, cause the inkjet head to perform a second ejecting operation of ejecting ink from at least the second nozzle toward a medium.

When at least one of the first tank and the first passage is replenished with ink having physical properties different from those of the first ink, the first ink contained in the inkjet head may flocculate. When the first ink contained in the inkjet head is in the flocculated state, it may be impossible to eject the ink from the first nozzles. For this reason, in the present disclosure, the control device determines whether or not the replenishment condition is satisfied. Further, in the case where the control device determines that the replenishment condition is satisfied when the print data instructing to print with the first ink is input, the control device controls the inkjet head such that the inkjet head performs the second ejecting operation. Therefore, even in the case where the first ink contained in the inkjet head is in the flocculated state, and thus it is impossible to eject the ink from the first nozzles, although the type of the ink which is used in printing is different from ink according to the print data, it is possible to print images corresponding to the print data.

Meanwhile, in the case where the control device determines that the replenishment condition is not satisfied when the print data instructing to print with the first ink is input, the control device controls the inkjet head such that the inkjet head performs the first ejecting operation. Therefore, even in the case where there is no possibility that the first ink contained in the inkjet head is in the flocculated state, it is possible to perform images corresponding to the print data with ink of a type corresponding to the print data.

DETAILED DESCRIPTION

Hereinafter, a preferred aspect of the present disclosure will be described.

<Overall Configuration of Inkjet Printer>

Figure 1:
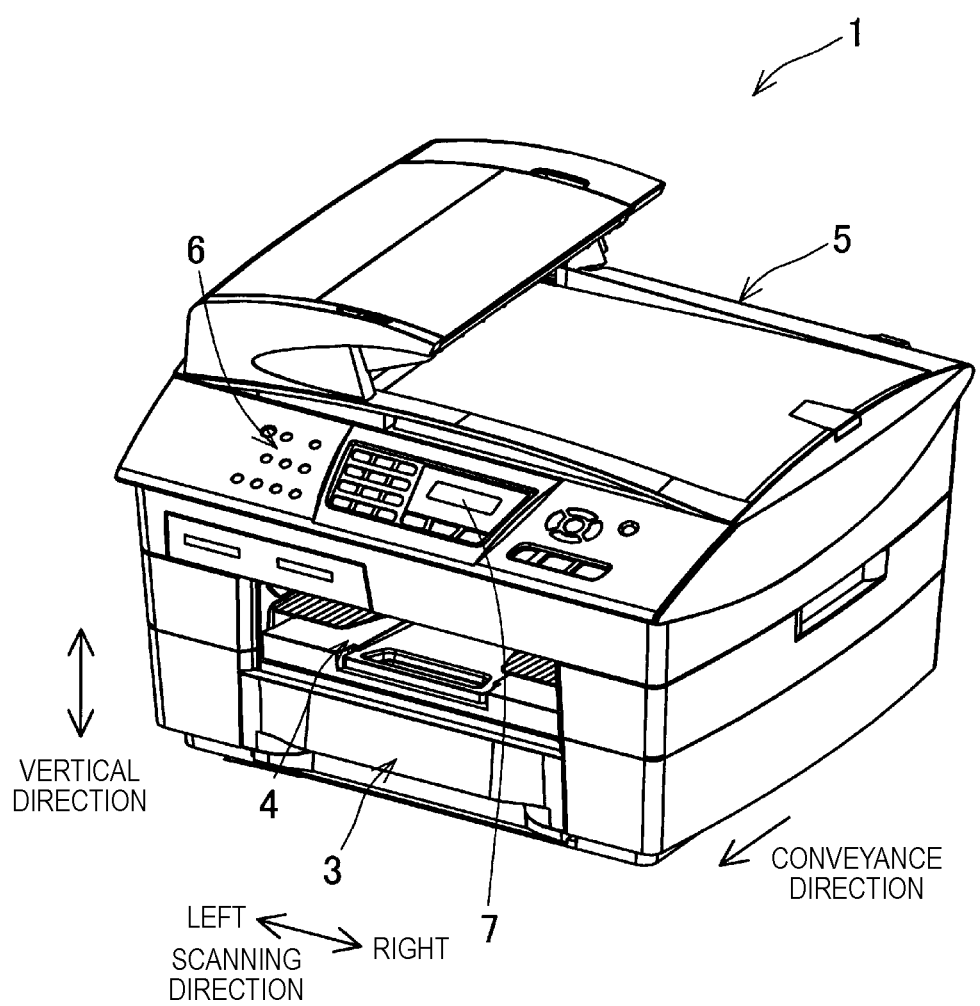
FIG. 1 is a view illustrating a rough configuration of a multi-function apparatus according to an aspect of the present disclosure.

An inkjet printer 1 according to the present aspect is a so-called multi-function apparatus capable of performing a variety of processing such as printing on a recording sheet P (medium of the present disclosure), reading images, and facsimileing. As shown in FIG. 1, the inkjet printer 1 includes a printing unit 2 (see FIG. 2), a feeding unit 3, a discharge unit 4, a reading unit 5, an operation unit 6, a display unit 7, and so on. The operation of the inkjet printer 1 is controlled by a control device 50 (see FIG. 4).

The printing unit 2 is installed inside the inkjet printer 1. When receiving a print command from a PC (not shown in the drawings) connected to the inkjet printer 1 or receiving a facsimile signal, the printing unit prints images corresponding to print data included in the corresponding signal, on recording sheets P. The printing unit 2 will be described below in detail. The feeding unit 3 is a part for feeding recording sheets P on which the printing unit 2 performs printing. The discharge unit 4 is a part onto which recording sheets P subjected to printing by the printing unit 2 are discharged. The reading unit 5 is a scanner or the like, and reads documents, for example, for facsimile transmission. The operation unit 6 has buttons and so on, and a user performs necessary operations on the inkjet printer 1 by operating the buttons of the operation unit 6. The display unit 7 is a liquid crystal display or the like, and displays information necessary in use of the inkjet printer 1.

<Printing Unit>

Figure 2:
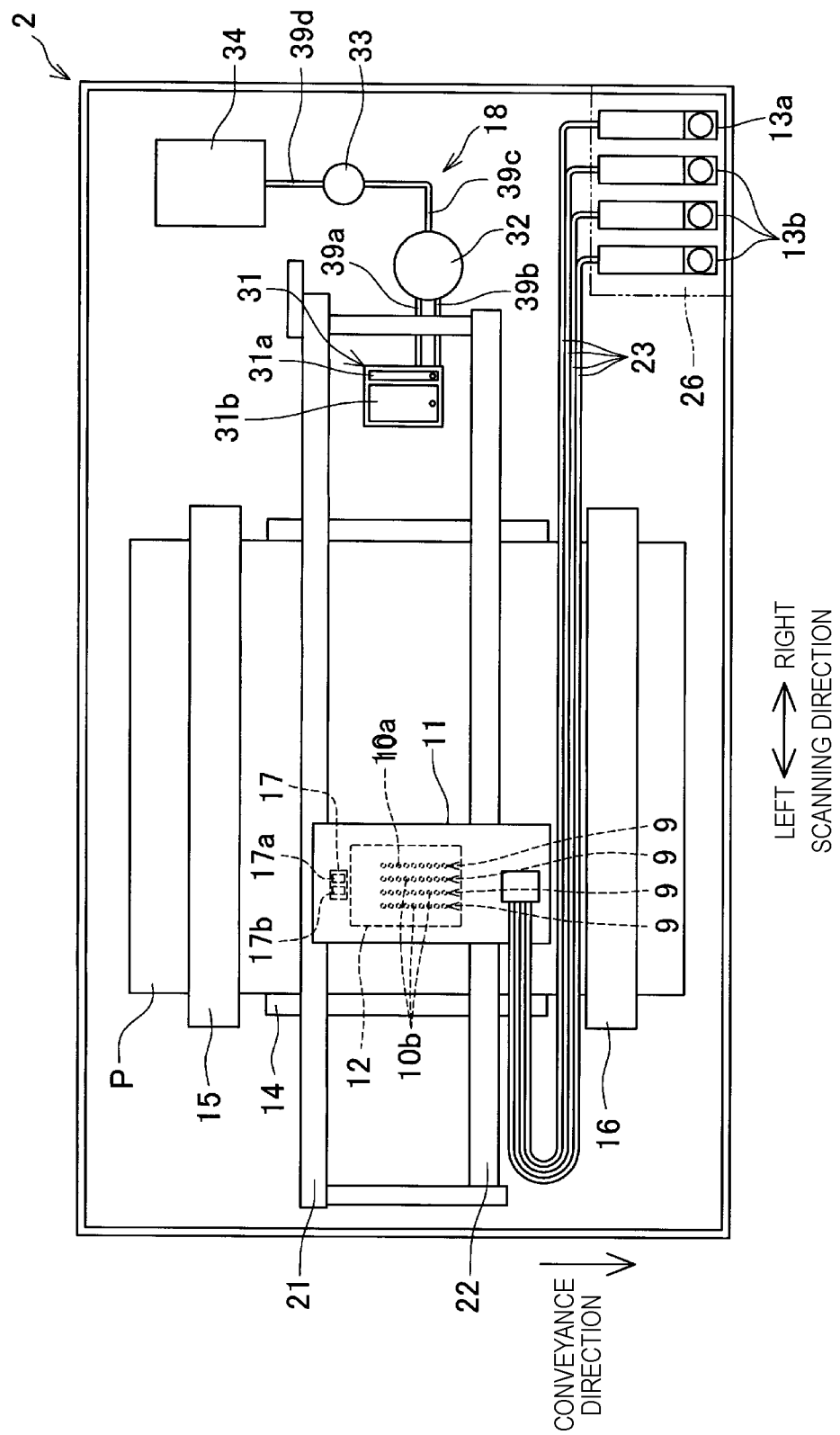
FIG. 2 is a view illustrating a rough configuration of a printing unit.

Now, the printing unit 2 will be described. As shown in FIG. 2, the printing unit 2 includes a carriage 11, an inkjet head 12, an ink tank 13a for a color, three ink tanks 13b for three colors, a platen 14, conveying rollers 15 and 16, a medium sensor 17, and a maintenance unit 18 (a discharging unit of the present disclosure).

The carriage 11 is supported by two guide rails 21 and 22 extending in a scanning direction, so as to be movable in the scanning direction. The carriage 11 is connected to a carriage motor 56 (see FIG. 4) via a belt and the like (not shown in the drawings). When the carriage motor 56 is driven, the carriage 11 moves in the scanning direction along the guide rails 21 and 22. Hereinafter, the right side and left side of the scanning direction will be defined as shown in FIG. 1 and FIG. 2, and a description will be made.

The inkjet head 12 is mounted on the carriage 11. The inkjet printer 1 has a plurality of nozzles 10a and 10b formed in the lower surface. The plurality of nozzles 10a and 10b are arranged in a conveyance direction perpendicular to the scanning direction so as to form nozzle rows 9. The inkjet head 12 have four nozzle rows 9 arranged side by side in the scanning direction. The rightmost nozzle row 9 is formed by the plurality of nozzles 10a (first nozzles of the present disclosure). From the nozzles 10a, black ink (first ink of the present disclosure) is ejected. Three left nozzle rows 9 are formed by the plurality of nozzles 10b (second nozzles of the present disclosure). From the nozzles 10b, color ink (second ink of the present disclosure) of yellow, cyan, and magenta is ejected in order from those forming the right nozzle row 9.

The ink tanks 13a and 13b are stored in a tank storage unit 26 provided at a part of the inkjet printer 1 positioned on the downstream side of the inkjet printer 1 in the conveyance direction and on the right side in the scanning direction, and are arranged side by side in the scanning direction. The ink tanks 13a and 13b are connected to the inkjet head 12 via tubes 23, respectively. The ink tank 13a (a first tank of the present disclosure) contains black ink. The ink tanks 13b of three colors (a second tank of the present disclosure) contain ink of yellow, cyan, and magenta, in order from one positioned on the right side. Further, the inks of four colors contained in the ink tanks 13a and 13b are supplied to the inkjet head 12 via the four tubes 23. In the present aspect, a tube 23 connected to the ink tank 13a, and an ink passage formed in the inkjet head 12 and connected to the nozzles 10a correspond to a first passage of the present disclosure. The tubes 23 connected to the ink tanks 13b, and ink passages formed in the inkjet head 12 and connected to the nozzles 10b correspond to a second passage of the present disclosure. The ink tanks 13a and 13b and the tank storage unit 26 will be described below in detail.

The platen 14 is disposed below the inkjet head 12 so as to face the inkjet head 12. When printing is performed on each recording sheet P, the platen 14 supports the corresponding recording sheet from below. In the conveyance direction, the conveying roller 15 is disposed on the upstream side from the platen 14, and the conveying roller 16 is disposed on the downstream side from the platen 14, respectively. The conveying rollers 15 and 16 are connected to a conveying motor 57 (see FIG. 4) via gears and so on (not shown in the drawings). When the conveying motor 57 is driven, the conveying rollers 15 and 16 rotate, whereby each recording sheet P is conveyed in the conveyance direction.

In the printing unit 2, the conveying rollers 15 and 16 conveys recording sheets P in the conveyance direction by a predetermined distance (for example, the length of the nozzle rows 9) at a time, and whenever a recording sheet P is conveyed by the predetermined distance, printing is performed on the recording sheet P by moving the carriage 11 in the scanning direction while ejecting the ink from the nozzles 10a and 10b toward the recording sheet P.

The medium sensor 17 is mounted on the carriage 11, and is positioned on the upstream side from the inkjet head 12 in the conveyance direction. The medium sensor 17 includes a light emitter 17a and a photo-receiver 17b. When light is radiated from the light emitter 17a radiates light toward the platen 14, the photo-receiver 17b receives light. On the basis of the amount of received light, the medium sensor detects the leading end of each recording sheet P. More specifically, since the surface of the platen 14 is black, when there is no recording sheet P on the platen 14, the amount of light which is received by the photo-receiver 17b is smaller than that in the case where there is a recording sheet P on the platen 14. By using this point, the medium sensor 17 detects change of the amount of light defected by the photo-receiver 17b from an amount smaller than a predetermined threshold to an amount equal to or larger than the threshold, thereby detecting whether the leading end of each recording sheet P has reached a position facing the medium sensor 17.

The maintenance unit 18 includes a nozzle cap 31, a switch unit 32, a suction pump 33, and a waste tank 34. The nozzle cap 31 is disposed on the right side of the platen 14. The nozzle cap 31 has a cap part 31a, and a cap part 31b adjacent to the left side of the cap part 31a. The nozzle cap 31 can be elevated and lowered by a cap elevating and lowering device 58 (see FIG. 4). When the carriage 11 is moved to a maintenance position on the right side from the platen 14, the nozzles 10a face the cap part 31a and the nozzles 10b face the cap part 31b. In this state, when the nozzle cap 31 is elevated by the cap elevating and lowering device 58, the plurality of nozzles 10a and 10b is covered by the nozzle cap 31. More specifically, the nozzles 10a are covered by the cap part 31a, and the nozzles 10b are covered by the cap part 31b.

The switch unit 32 is connected to the cap parts 31a and 31b via tubes 39a and 39b. The switch unit 32 is connected to the suction pump 33 via a tube 39c. The switch unit 32 selectively connects one of the cap parts 31a and 31b to the suction pump 33. The suction pump 33 is a tube pump or the like. The suction pump 33 is connected to the waste tank 34 via a tube 39d.

In the maintenance unit 18, in the state where the plurality of nozzles 10a and 10b is covered by the nozzle cap 31 as described above, the cap part 31a is connected to the suction pump 33 by the switch unit 32, and then the suction pump 33 is driven. In this way, it is possible to perform suction purge of black ("discharge of ink from the first nozzles" of the present disclosure), i.e. an operation of discharging the black ink contained in the inkjet head 12 from the plurality of nozzles 10a. In the maintenance unit 18, in the state where the plurality of nozzles 10a and 10b is covered by the nozzle cap 31 as described above, the cap part 31b is connected to the suction pump 33 by the switch unit 32, and then the suction pump 33 is driven. In this way, it is possible to perform suction purge of the colors, i.e. an operation of discharging the color ink contained in the inkjet head 12 from the plurality of nozzles 10b.

<Ink Tanks and Tank Storage Unit>

Figure 3A:
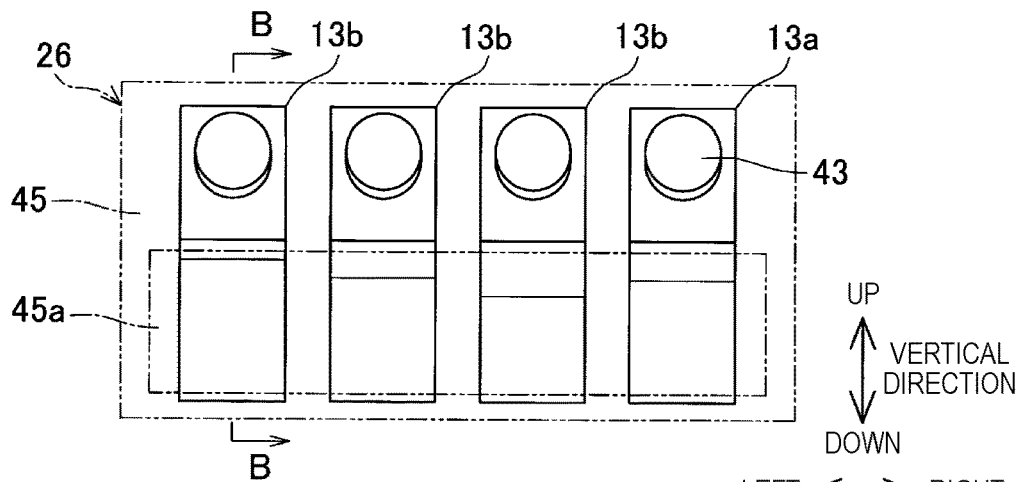
FIG. 3A is a view illustrating ink tanks and a tank storage unit as seen from the downstream side of the conveyance direction.
Figure 3B:
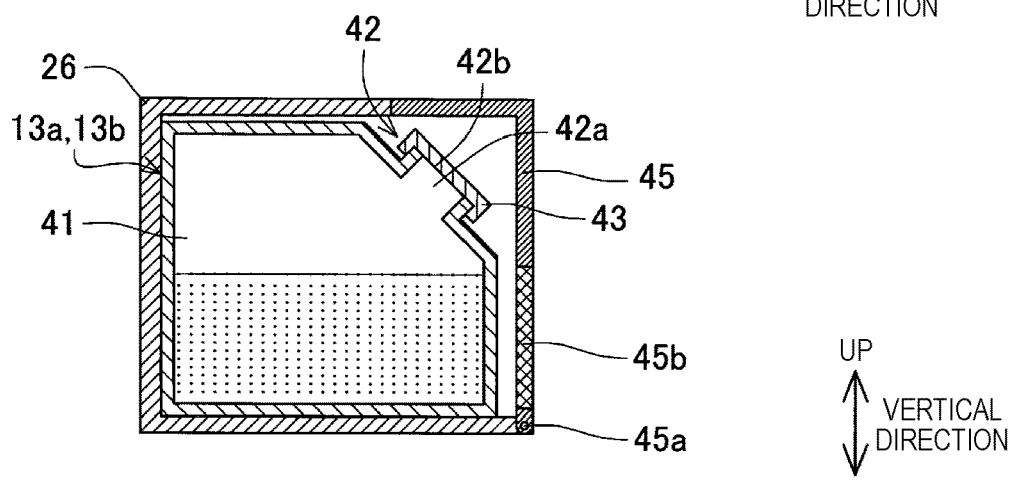
FIG. 3B is a cross-sectional view taken along a line B-B of FIG. 3A.
Figure 3C:
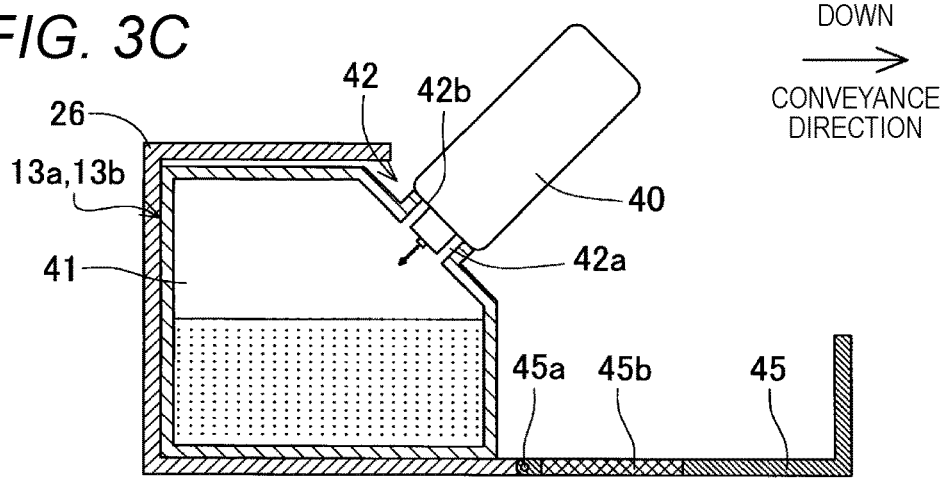
FIG. 3C is a view corresponding to FIG. 3B and illustrating when ink is added to an ink tank.

Now, the ink tanks 13a and 13b and the tank storage unit 26 will be described in detail. As shown in FIG. 3A to FIG. 3C, the ink tanks 13a and 13b have a cuboid shape, and have internal storage spaces 41 for storing ink. The ink tanks 13a and 13b have ink replenishment parts 42 at the upper end parts on the downstream side in the conveyance direction. The ink replenishment parts 42 have replenishment passages 42a connected to the storage spaces 41, and have replenishment inlets 42b at the leading end parts of the replenishment passages 42a. The ink replenishment parts 42 have tank caps 43 for closing the replenishment inlets 42b.

The tank storage unit 26 is formed substantially in a cuboid box shape having the scanning direction as its longitudinal direction, and stores the ink tanks 13a and 13b in it. The tank storage unit 26 has a cover 45 at a part on the downstream side in the conveyance direction. The cover 45 has a pivot shaft 45a provided at its lower end part and parallel with the scanning direction, and can swing on the pivot shaft. Therefore, the tank storage unit 26 can be opened and closed by swinging the cover 45. The tank storage unit 26 has a cover sensor 46 (see FIG. 4) for detecting whether the cover 45 is open or closed.

For example, when printing is performed by the printing unit 2, since the cover 45 is closed as shown in FIG. 3A and FIG. 3B, it is impossible to replenish the ink tanks 13a and 13b with ink. At this time, since the ink replenishment parts 42 are covered with the tank caps 43, it is possible to prevent the ink contained in the storage spaces 41 from spilling out from the replenishment inlets 42b, and suppress moisture in the ink contained in the storage spaces 41 from evaporating.

When the cover 45 is opened, as shown in FIG. 3C, the ink tanks 13a and 13b are exposed. In this state, when the tank caps 43 are removed from the ink replenishment parts 42, it is possible to supply ink from ink bottles 40 containing ink to the storage spaces 41 through the replenishment inlets 42b.

The ink tanks 13a and 13b are made of a transparent synthetic resin material. Meanwhile, the cover 45 of the tank storage unit 26 has a window part 45b made of a transparent synthetic resin material. Therefore, when the cover 45 is closed, a user can visually recognize the amounts of ink contained in the storage spaces 41 from the outside of the ink tanks 13a and 13b through the window part 45b.

<Control Device>

Figure 4:
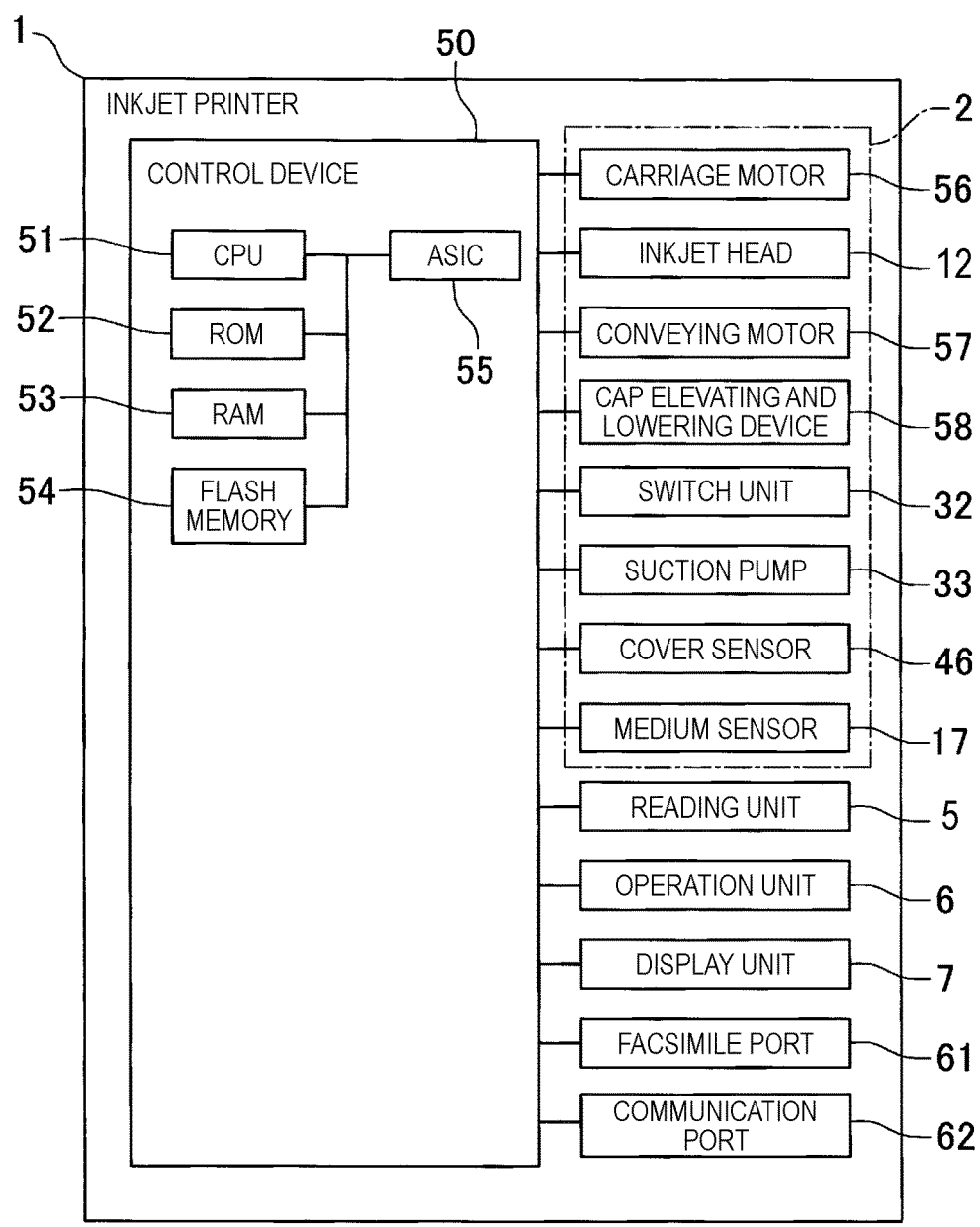
FIG. 4 is a block diagram illustrating the electrical configuration of the inkjet printer.

Now, the control device 50 for controlling the operation of the inkjet printer 1 will be described. As shown in FIG. 4, the control device 50 is composed of various components such as a central processing unit (CPU) 51, a read only memory (ROM) 52, a random access memory (RAM) 53, a flash memory 54 (a memory of the present disclosure), and an application specific integrated circuit (ASIC) 55, which control the operations of the printing unit 2, the reading unit 5, the display unit 7, and so on. The control device 50 detects whether the cover 45 is open or closed, on the basis of a signal from the cover sensor 46. In the inkjet printer 1, the control device detects the leading end of each recording sheet P on the basis of a signal from the medium sensor 17. The control device 50 receives signals according to operations performed on the operation unit 6, and performs processing according to the operations performed on the operation unit 6.

The inkjet printer 1 includes a facsimile port 61 (a first input unit of the present disclosure), and a communication port 62 (a second input unit of the present disclosure). The facsimile port 61 is a port which is for performing facsimile communication and is connected to a phone line. The inkjet printer 1 receives facsimile data transmitted by facsimile communication (a first communication system of the present disclosure) and including print data, by the facsimile port 61. The communication port 62 is a port which is for performing communication with another device such as a PC with a communication system (a second communication system of the present disclosure) different from facsimile communication and is connected to an external device such as a PC. The communication port 62 is, for example, a USB (Universal Serial Bus) port, a LAN (Local Area Network) port, or the like. The inkjet printer 1 receives print commands including print data transmitted from the PC or the like, by the communication port. Although FIG. 4 shows only one communication port 62, the inkjet printer 1 may have a plurality of communication ports 62. For example, the inkjet printer may have both of a USB port and a LAN port.

Although FIG. 4 shows only one CPU 51, the control device 50 may be configured to have only one CPU 51 such that the one CPU 51 performs general processing, or may be configured to have a plurality of CPUs 51 such that the plurality of CPUs 51 performs processing together. Although FIG. 4 shows only one ASIC 55, the control device 50 may be configured to have only one ASIC 55 such that the one ASIC 55 performs general processing, or may be configured to have a plurality of ASICs 55 such that the plurality of ASICs 55 performs processing together.

<Control During Printing>

Now, the flow of control which the control device 50 performs when the printing unit 2 performs monochrome printing (when print data instructing to print with black ink has been input) will be described. The printing unit 2 can also perform color printing; however, control of the control device 50 for performing color printing is the same as that which is used in the related art, and thus a description thereof will not be made here.

For example, when replenishing the ink tank 13*a* of the inkjet printer 1 with black ink, the user may perform ink replenishment using an ink bottle 40 containing black ink having physical properties different from those of the black ink contained in the ink tank 13*a*, by mistake. In this case, since the black ink having different physical properties intermixes, there is a possibility that the black ink will flocculate and the flocculated ink will reach the inkjet head 12. The black ink having different physical properties is, for example, black pigment ink and black dye ink, or two types of black ink containing different pigments.

When the black ink contained in the inkjet head 12 is in the flocculated state, even though the inkjet head 12 is driven, it may be impossible to eject the black ink from the nozzles 10*a*. For this reason, in the present aspect, while the inkjet printer 1 is operating, the control device 50 always determines whether a replenishment condition related to replenishment of the ink tank 13*a* with ink having physical properties different from those of the black ink contained in the ink tank 13*a* is satisfied, as will be described below, thereby determining whether there is a possibility that the black ink contained in the inkjet head 12 is in the flocculated state. A method of determining whether the replenishment condition is satisfied will be described below in detail.

In the inkjet printer 1, the control device 50 is configured to selectively set the inkjet printer to one mode of a saving mode for storing and saving printed print data in the flash memory 54 and a non-saving mode for deleting printed print data without storing the corresponding data in the flash memory 54. For example, in terms of personal information protection and so on, the inkjet printer 1 is set to the non-saving mode during shipment (before it is used for the first time). Thereafter, in response to an operation performed on the operation unit 6 by the user, the control device 50 can selectively set the inkjet printer to one mode of the saving mode and the non-saving mode. In the case where the inkjet printer is in the saving mode, for example, when print data is input, the control device can control the display unit 7 such that the display unit displays corresponding images, thereby making it possible for the user to select whether to print the images on recording sheets P.

In the present aspect, print data which the inkjet printer 1 receives is print data transmitted together with a print command of the user from a PC or the like, print data of facsimiles, or print data of reports on facsimiles. Here, a facsimile report means, for example, a list of transmission sources and destinations of facsimiles, which is printed, for example, when a predetermined number of facsimiles have been transmitted or received. Print data of facsimile reports are generated by the control device 50. Print data which is input together with user's printing instructions, print data of facsimiles, and print data of facsimile reports have different data formats in their head parts and so on. In the present aspect, the data format of print data of facsimiles or facsimile reports corresponds to a predetermined data format of the present disclosure.

When the printing unit 2 performs monochrome printing, the control device 50 performs control on the basis of whether it is determined that the replenishment condition is satisfied, whether the inkjet printer is in the saving mode or in the non-saving mode, and the data format of corresponding print data.

Figure 5:
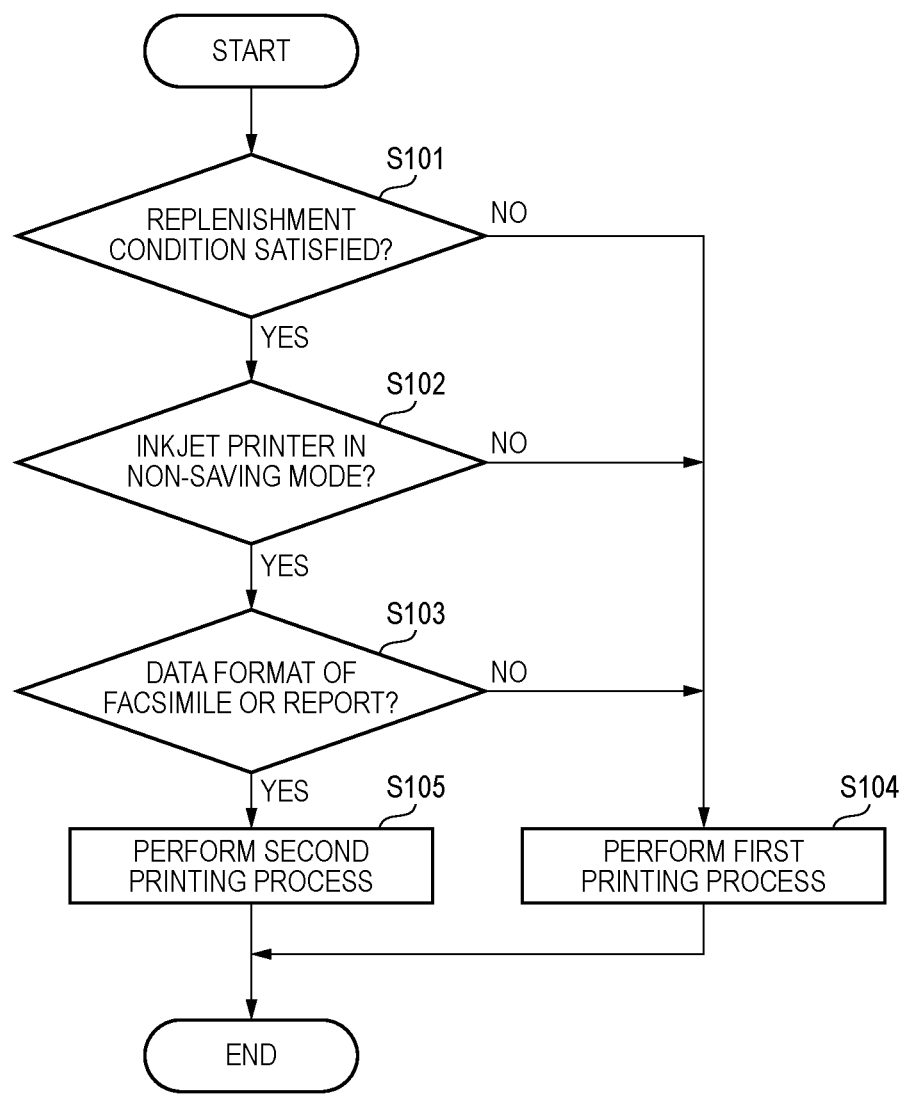
FIG. 5 is a flow chart illustrating the flow of processing which is performed during printing.

More specifically, when print data instructing to print with black ink is input, the control device 50 starts processing according to the flow of FIG. 5. In this processing, in the case where the replenishment condition is not satisfied ("NO" in step S101), when the inkjet printer is in the saving mode ("NO" in step S102), and the data format of the print data is the data format of print data which can be input together with a user's printing instruction (the data format is not the predetermined data format) ("NO" in step S103), the control device 50 performs a first printing process such that the printing unit prints images corresponding to the print data on recording sheets P (step S104). In the first printing process, the control device 50 performs control such that the inkjet head performs a first ejecting operation of ejecting the black ink from the nozzles 10*a* toward recording sheets P and prohibiting ejection of the color ink from the nozzles 10*b* while the carriage 11 moves in the scanning direction. In this case, while the inkjet printer 1 is operating, the control device 50 always determines whether the replenishment condition is satisfied. Therefore, the control device performs determination of step S101 just before or just after reception of print data instructing to print with black ink.

Meanwhile, in the case where it is determined that the replenishment condition is satisfied ("YES" in step S101), and the inkjet printer is in the non-saving mode ("YES" in step S102), and the data format of the print data is the data format of print data of facsimiles or facsimile reports ("YES" in step S103), the control device performs a second printing process such that the printing unit prints the images corresponding to the print data on recording sheets P (step S105). In the second printing process, the control device 50 performs control such that the inkjet head performs a second ejecting operation of ejecting the inks of the four colors from the nozzles 10*a* and 10*b* toward recording sheets P such that the ink lands while overlapping while the carriage 11 moves in the scanning direction while. During the second ejecting operation, the control device performs control such that the ejection amounts of ink from the nozzles 10*a* and 10*b* are smaller than the ejection amount of ink from the nozzles 10*a* in the first ejecting operation and the ejection amount in the case of ejecting the ink only from the nozzles 10*b*, respectively. In this case, the control device performs assignment of use of the nozzles 10*a* and 10*b* for printing the images corresponding to the print data such that the ejection frequency of ink from the nozzles 10*b* becomes higher than the ejection frequency of ink from the nozzles 10*a*, and performs control such that the printing unit ejects the ink from the nozzles 10*a* and 10*b*. For example, the control device assigns ejection of ink from the nozzles 10*a* and 10*b* for printing the images corresponding to the print data to ejection of ink from the nozzles 10*b* and ejection of ink from the nozzles 10*a*, about in the ratio of 70:30.

The black ink contained in the inkjet head 12 does not flocculate unless black ink is added to the ink tank 13*a*. When the black ink contained in the inkjet head 12 is not in the flocculated state, it is possible to eject the black ink from the nozzles 10*a*. Therefore, in the case where the replenishment condition is not satisfied, when performing monochrome printing, the control device performs control such that the inkjet head performs the first ejecting operation. Therefore, it is possible to print the images corresponding to the print data with the black ink according to the print data.

Meanwhile, in the case where the black ink contained in the inkjet head 12 is in the flocculated state when the control device performs control such that the inkjet head performs the first ejecting operation, since the inkjet head cannot eject the black ink from the nozzles 10a and prohibits ejection of the color ink from the nozzles 10b, the images may not be printed. In this case, the control device performs control such that suction purge of black mentioned above is performed. By discharging the flocculated black ink contained in the inkjet head 12, it is possible to restore the inkjet head 12 to the state where it can eject the black ink from the nozzles 10a. However, in the case where the inkjet printer is in the non-saving mode, after printing a facsimile or a facsimile report, corresponding print data is deleted. In general, users cannot manage data which are the sources of print data of facsimiles and facsimile reports. For this reason, in the case where the black ink is in the flocculated state and thus it is impossible to print the images, thereafter, even through the inkjet head 12 is restored to the state where it can eject the black ink from the nozzles 10a, it is impossible to perform re-printing. This becomes a problem.

For this reason, in the present aspect, in the case where the replenishment condition is satisfied, and the inkjet printer is in the non-saving mode, and the data format of the print data is the data format of facsimiles or facsimile reports, the control device performs control such that the inkjet head performs the second ejecting operation. Therefore, although the black ink contained in the inkjet head 12 is in the flocculated state, and thus it is impossible to eject the black ink from the nozzles 10a, the color ink is ejected from the nozzles 10b. Therefore, although the type of the ink which is used in printing is different from ink according to the print data, it is possible to print the images corresponding to the print data. Therefore, it is possible to prevent a failure from occurring in printing the images corresponding to the print data, and prevent re-printing from being impossible.

Meanwhile, in the case where the inkjet printer is in the saving mode, print data is saved in the flash memory 54. In the case of printing according to user's printing instructions, in general, users can manage data which are the sources of corresponding print data. For example, such data may be saved in PCs. For this reason, even through the control device determines that the replenishment condition is satisfied, when the inkjet printer is in the saving mode, and the data format of the print data is the data format of print data which can be input together with a user's printing instruction, the control device performs the first printing process such that the printing unit prints the images.

When replenishing the ink tank 13a with black ink, when ink having the same physical properties as those of the ink contained in the ink tank is added, the black ink contained in the inkjet head 12 does not flocculate. Therefore, in this case, it is possible to appropriately print by performing printing by the first printing process. In the case where the black ink contained in the inkjet head 12 is in the flocculated state, when the first printing process is performed, black ink may not be ejected from the nozzles 10a, resulting in a failure in printing the images. However, even in this case, thereafter, when suction purge of black is performed, it is possible to perform re-printing using the print data or data which is the source of the print data saved in the flash memory 54.

In the present aspect, during the second printing process, the control device performs control such that the inkjet head 12 performs the second ejecting operation of ejecting ink from all of the nozzles 10a and 10b. Therefore, in the case where the black ink contained in the inkjet head 12 is not in the flocculated state, or in the case where the degree of flocculation is not so high, the black ink is ejected from the nozzles 10a. Therefore, as compared to the case of ejecting from ink from the nozzles 10b and prohibiting ejection of ink from the nozzles 10a, in the second ejecting operation, it is possible to print the images in a color closer to a color in which the images are printed by the first ejecting operation.

In the second ejecting operation, in case the black ink contained in the inkjet head 12 is not the flocculated state and the black ink is ejected from the nozzles 10a, it is necessary to set the ejection amount of ink from the nozzles 10b to an amount less than that for the case of performing printing by ejecting ink from only the nozzles 10b. However, in this case, when the ejection amount of ink from the nozzles 10b is set to be too small, when the black ink is not ejected from the nozzles 10a, the user may not visually recognize the printed images.

For this reason, in the present aspect, assignment of use of the nozzles 10a and 10b for printing the images corresponding to the print data is performed such that the frequency of ejection of ink from the nozzles 10b is higher than the frequency of ejection of ink from the nozzles 10a. Therefore, even though the black ink is not ejected from the nozzles 10a during the second ejecting operation, the user can visually recognize the printed images.

<Determination on Whether Replenishment Condition is Satisfied>

Figure 6:
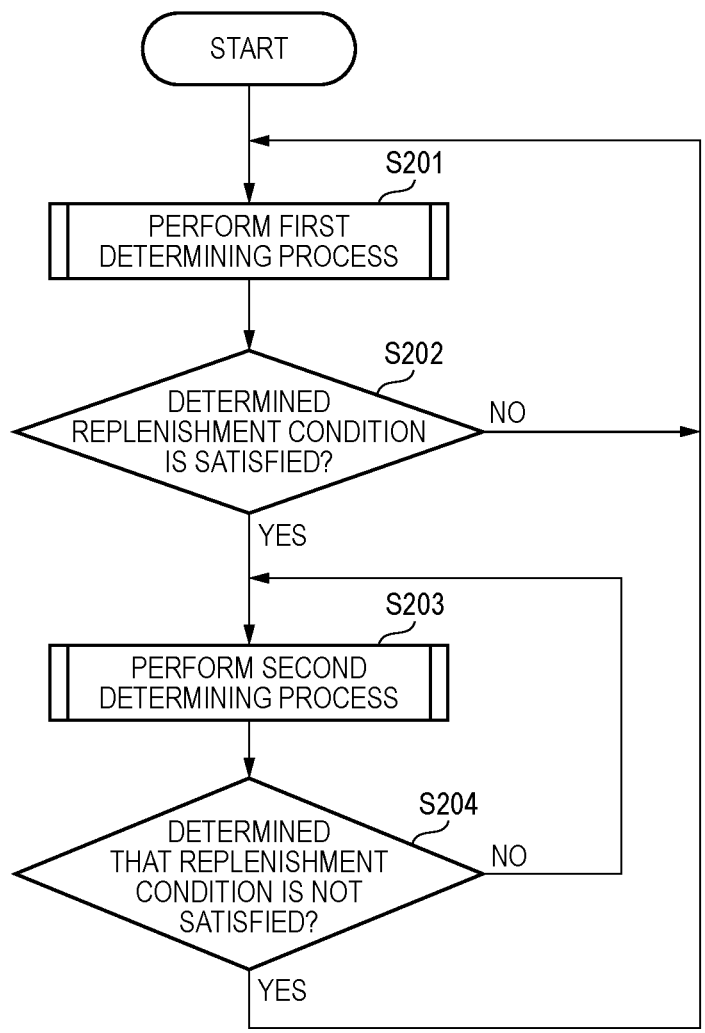
FIG. 6 is a flow chart illustrating the flow of processing for determining whether a replenishment condition is satisfied.

Now, a method of determining whether the replenishment condition is satisfied will be described. In the present aspect, whether the replenishment condition is satisfied is determined by performing processing according to the flow of FIG. 6. The processing of FIG. 6 is started, for example, when the inkjet printer 1 is connected to a socket for the first time.

Now, the processing of FIG. 6 will be described. The control device 50 first performs a first determining process (step S201). Whenever it is determined in the first determining process that the replenishment condition is not satisfied ("NO" in step S202), the control device returns to step S201, and repeats the first determining process.

Meanwhile, in the case where it is determined in the first determining process that the replenishment condition is satisfied ("YES" in step S202), the control device 50 performs a second determining process (step S203). Whenever it is determined in the second determining process that the replenishment condition is satisfied ("NO" in step S204), the control device returns to step S203, and repeats the second determining process. In the case where it is determined in the second determining process that the replenishment condition is not satisfied ("YES" in step S204), the control device returns to step S201, and performs the first determining process.

<First Determining Process>

Figure 7:
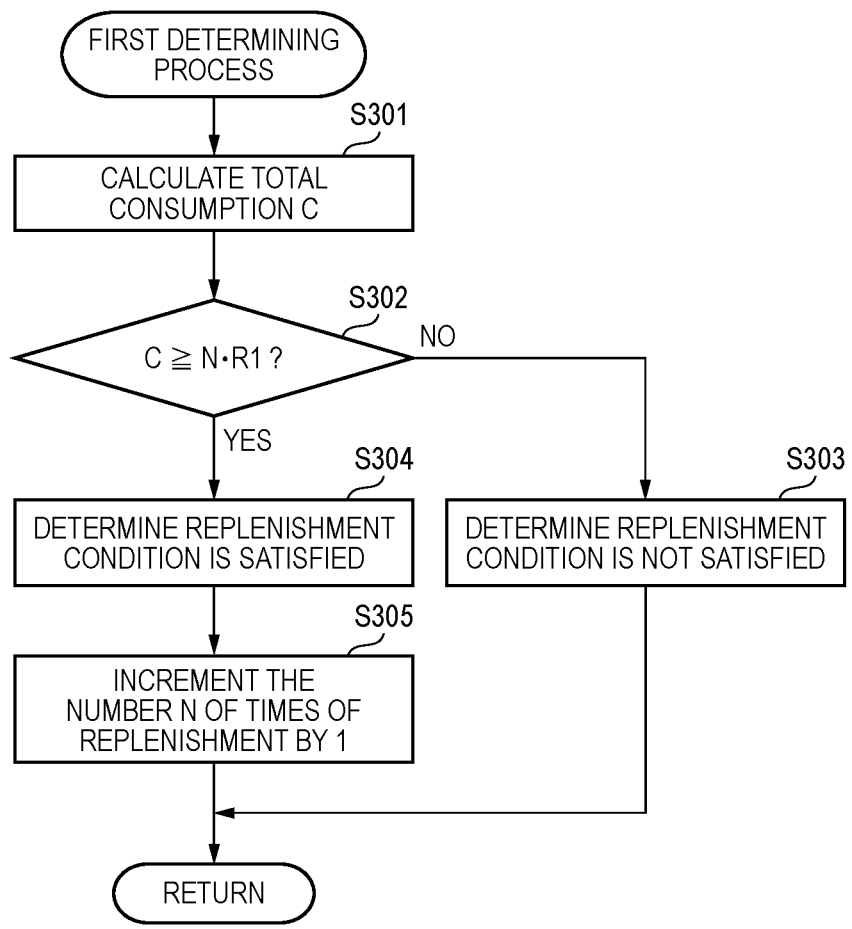
FIG. 7 is a flow chart illustrating the flow of a first determining process of FIG. 6.

The first determining process of step S201 will be described. During the first determining process, as shown in FIG. 7, first, the control device 50 calculates a total consumption C which is the total amount of black ink consumed from the nozzles 10a since the first use of the inkjet printer 1 (step S301).

In the present aspect, the control device 50 counts the number of times of ejection of ink from the nozzles 10a since the first use of the inkjet printer 1, the number of times suction purge of black has been performed, and saves the count in the flash memory 54. In the flash memory 54, information on a maximum storage amount R1 which is the maximum ink storage amount of the ink tank 13a is stored in advance. Further, in the flash memory 54, information on the amount of black ink which is ejected from the nozzles 10a at a time, and information on the amount of ink which is discharged from the nozzles 10a whenever suction purge of black is performed are stored. Furthermore, in the flash memory 54, information on the number N of times of replenishment of the ink tank 13a with ink. When black ink is added to the ink tank 13a during the first use of the inkjet printer 1, the number N of times of replenishment is set to 1.

In step S301, using the information stored in the flash memory 54, i.e. the number of times the black ink has been ejected from the nozzles 10a, the number of times suction purge of black has been performed, the information on the amount of black ink which is ejected from the nozzles 10a at a time, and the information on the amount of black ink which is discharged from the nozzles 10a whenever suction purge is performed, the control device calculates the total consumption C.

In the case where the calculated total consumption C is smaller than an amount defined as the product of the maximum storage amount R1 and N (N×R1) ("NO" in step S302), the control device 50 determines that the replenishment condition is not satisfied (step S303). Meanwhile, in the case where the calculated total consumption C is equal to or larger than the above-mentioned amount (N× R1) ("YES" in step S302), the control device 50 determines that the replenishment condition is satisfied (step S304), and increments the number N of times of replenishment by 1 (step S305). Therefore, when the number N of times of replenishment is 1, when the total consumption C is smaller than the maximum storage amount R1, it is determined that the replenishment condition is not satisfied; whereas when the total consumption C is equal to or larger than the maximum storage amount R1, it is determined that the replenishment condition is satisfied. When the number N of times of replenishment is 2 or greater, when the total consumption C is equal to or larger than an amount defined as ([N−1]×R1) and is smaller than the above-mentioned amount (N×R1), it is determined that the replenishment condition is not satisfied, and thereafter, when the total consumption C becomes equal to or larger than the above-mentioned amount (N×R1), it is determined that the replenishment condition is satisfied afterward.

On the assumption that when black ink is added to the ink tank 13a, black ink is added until the residual amount reaches the maximum storage amount R1, it is assumed that whenever the total consumption C becomes a multiple of the maximum storage amount R1, replenishment of the ink tank 13a with black ink has been performed. Further, when black ink is added to the ink tank 13a, as described above, black ink contained in the inkjet head 12 may flocculate. For this reason, in the present aspect, as described above, the control device determining whether the replenishment condition is satisfied, on the basis of the total consumption C, thereby determining whether there is a possibility that black ink contained in the inkjet head 12 is in the flocculated state.

<Second Determining Process>

Figure 8:
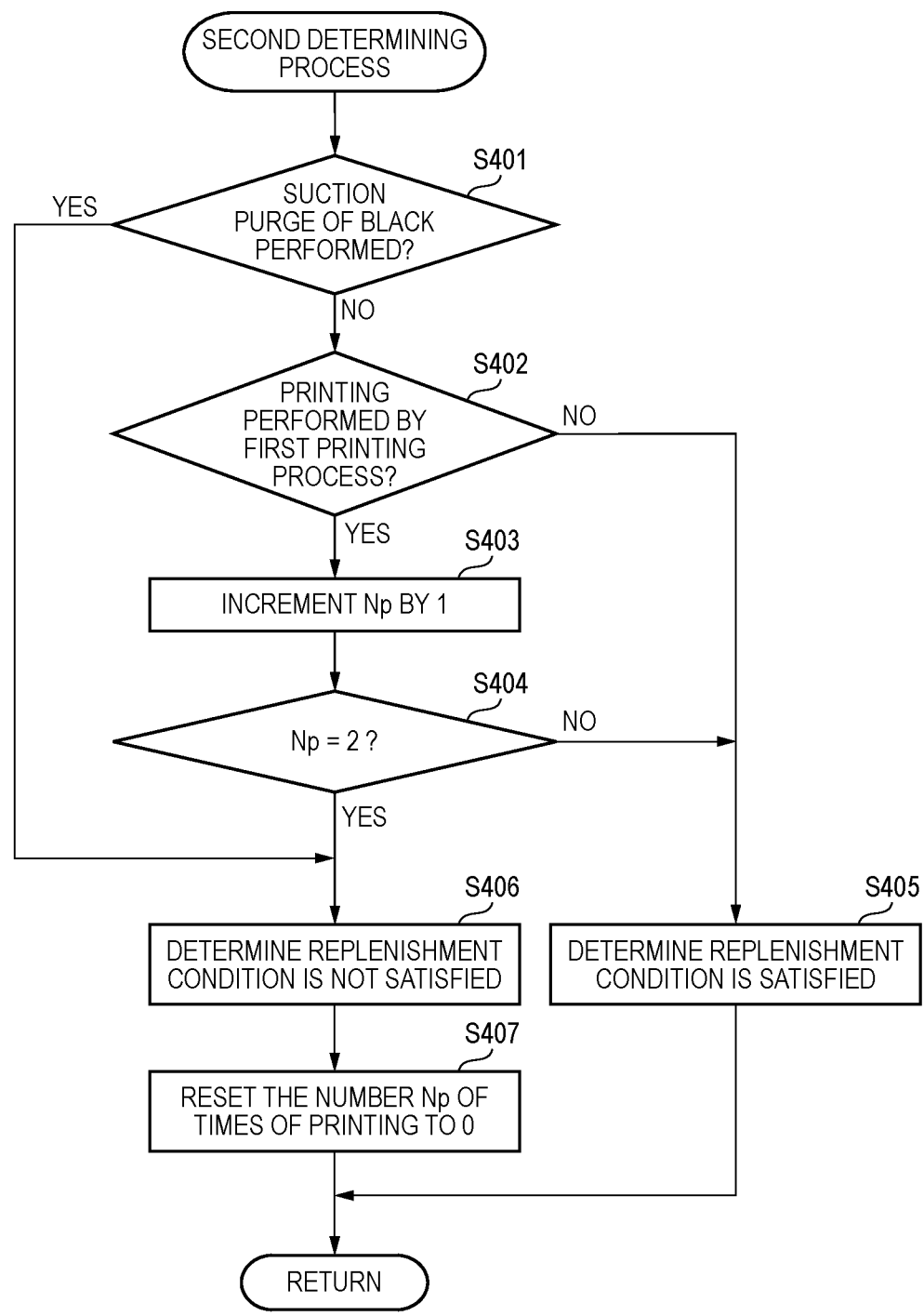
FIG. 8 is a flow chart illustrating the flow of a second determining process of FIG. 6.

Now, the second determining process of step S203 will be described. During the second determining process, as shown in FIG. 8, in the case where suction purge of black has not been performed ("NO" in step S401), and printing also has not been performed by the first printing process, the control device 50 determines that the replenishment condition is satisfied (step S405). Meanwhile, in the case where suction purge of black has not been performed ("NO" in step S401), but printing has been performed has been performed by the first printing process ("YES" in step S402), the control device 50 increments the number Np of times of printing by 1 (step S403). The number Np of times of printing is the number of times of printing has been performed by the first printing process since the replenishment condition was determined as being satisfied for the first time, and is stored in the flash memory 54.

In the case where the number Np of times of printing is 1 ("NO" in step S404), the control device 50 determines that the replenishment condition is satisfied (step S405). Meanwhile, in the case where the number Np of times of printing is 2 ("YES" in step S404), the control device 50 determines that the replenishment condition is not satisfied (step S406), and resets the number Np of times of printing to 0 (step S407). Even in the case where suction purge of black has been performed ("YES" in step S401), the control device 50 determines that the replenishment condition is not satisfied (step S406), and resets the number Np of times of printing to 0 (step S407).

In the case where black ink contained in the inkjet head 12 is in the flocculated state, even though the first printing process is performed, the images are not printed. For this reason, in this case, in general, the user instructs the inkjet printer to perform suction purge of black and then perform re-printing, for example, by operating the operation unit 6. In other words, in the case where after printing was performed by the first printing process, suction purge of black was skipped and the next printing has been performed by the first printing process, it is possible to assume that black ink contained in the inkjet head 12 is not in the flocculated state. Therefore, in the present aspect, when the number Np of times of printing becomes 2 while it is being determined that the replenishment condition is satisfied, the control device determines that the replenishment condition is not satisfied afterward.

In the case where black ink contained in the inkjet head 12 is in the flocculated state, when suction purge of black is performed such that the black ink is discharged from the nozzles 10a, the flocculated ink is removed from the inkjet head 12. Therefore, in the present aspect, when suction purge of black is performed while it is being determined that the replenishment condition is satisfied, the control device determines that the replenishment condition is not satisfied afterward.

Although the preferred aspect of the present disclosure has been described, the present disclosure is not limited to the above-described aspect, and can be modified in various forms within the scope disclosed in claims.

The method of determining whether the replenishment condition is satisfied on the basis of the total consumption C is not limited to that of the above-described aspect. For example, in a first modification, besides the information on the maximum storage amount R1, information on the black ink filling amount R2 of an unused ink bottle 40 filled with black ink is stored in the flash memory 54. In a first modification, the filling amount R2 is an amount equal to or smaller than the maximum storage amount R1.

Figure 9:
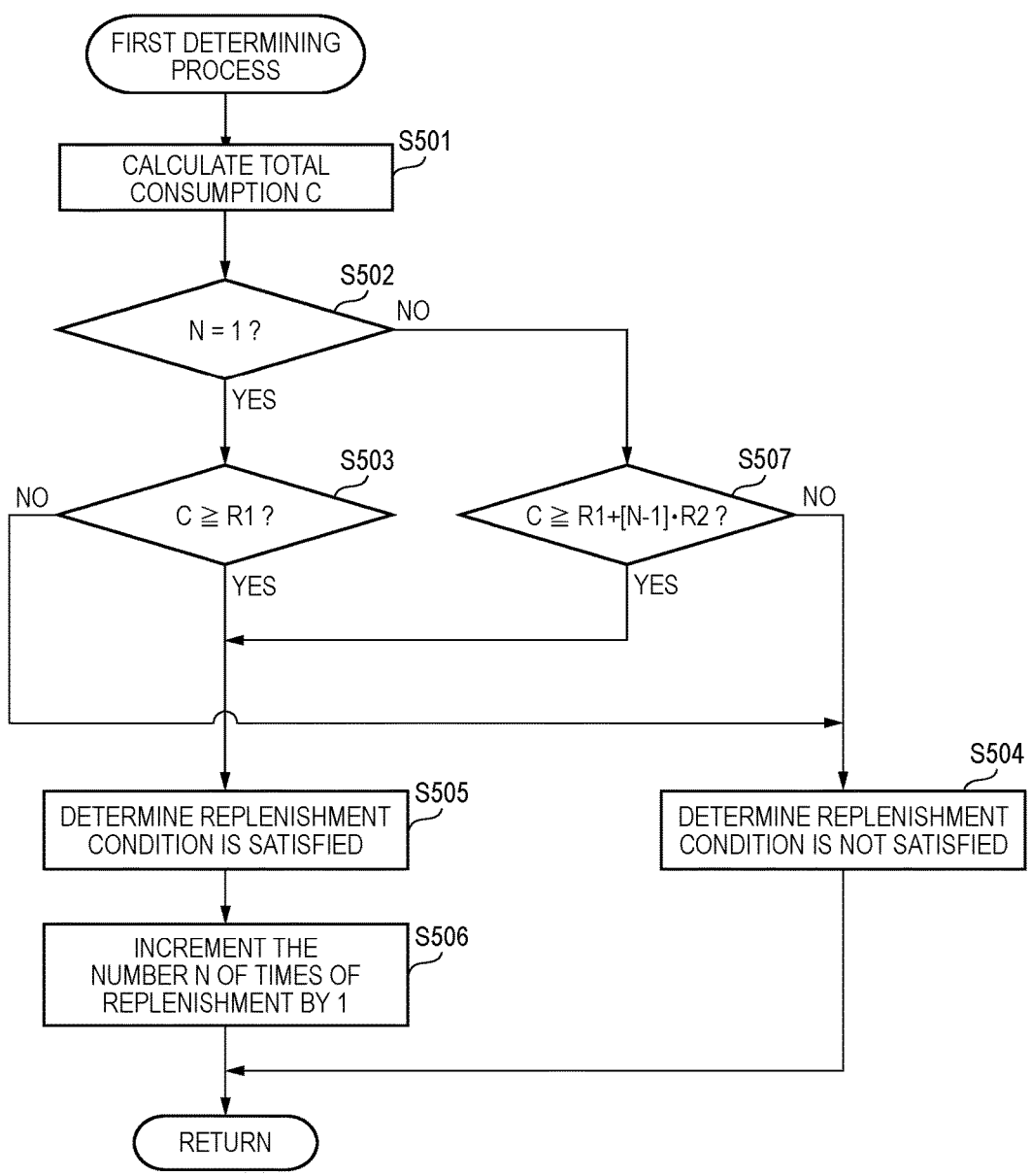
FIG. 9 is a flow chart illustrating the flow of a first determining process of a first modification.

In the first modification, as shown in FIG. 9, during the first determining process, similarly to the above-described aspect, the control device calculates the total consumption C (step S501). In the case where the number N of times of replenishment is 1 ("YES" in step S502), when the total consumption C is smaller than the maximum storage amount R1 ("NO" in step S503), the control device determines that the replenishment condition is not satisfied (step S504). Meanwhile, when the total consumption C is equal to or larger than the maximum storage amount R1 ("YES" in step S503), the control device determines that the replenishment condition is satisfied (step S505), and increments the number N of times of replenishment by 1 (step S506).

Meanwhile, when the number N of times of replenishment is equal to or larger than 2 ("NO" in step S502), when the total consumption C is smaller than an amount (R1+[N−1]×R2) defined as the sum of the maximum storage amount R1 and the product of the filling amount R2 and (N−1), the control device determines that the replenishment condition is not satisfied (step S504). When the total consumption C is equal to or larger than the above-mentioned amount (R1+[N−1]×R2) ("YES" in step S507), the control device determines that the replenishment condition is satisfied, and increments the number N of times of replenishment by 1 (step S506). Therefore, in the first modification, when the case where the number N of times of replenishment is equal to or larger than 2, when the total consumption C is equal to or larger than an amount defined as (R1+[N−2]×R2) and is smaller than the amount (R1+[N−1]×R2), the control device determines that the replenishment condition is not satisfied. Thereafter, when the total consumption C becomes equal to or larger than the amount (R1+[N−1]×R2), the control device determines that the replenishment condition is satisfied afterward.

On the assumption that black ink is added to the ink tank 13a until the residual amount reaches the maximum storage amount R1 when the inkjet printer 1 is used for the first time, it is assumed that whenever the total consumption C reaches the maximum storage amount R1, replenishment of the ink tank 13a with black ink has been performed. Further, when black ink is added to the ink tank 13a, as described above, black ink contained in the inkjet head 12 may flocculate. For this reason, in the above-described aspect, when the number N of times of replenishment is 1, when the total consumption C is smaller than the maximum storage amount R1, the control device determines that the replenishment condition is not satisfied; whereas when the total consumption C is equal to or larger than the maximum storage amount R1, the control device determines that the replenishment condition is satisfied.

On the assumption that the second replenishment and afterward of the ink tank 13a are performed with black ink, and all of ink contained in an ink bottle 40 is supplied into the ink tank 13a, that is, the filling amount R2 of black ink is supplied into the ink tank 13a, it is assumed that whenever the total consumption C reaches an amount defined as the sum of the maximum storage amount R1 and a multiple of the filling amount R2, replenishment of the ink tank 13a with black ink has been performed. Further, when black ink is added to the ink tank 13a, as described above, the black ink contained in the inkjet head 12 may flocculate. For this reason, in the first modification, when the number N of times of replenishment is 2 or greater, when the total consumption C is equal to or larger than the amount (R1+[N−2]×R2) and is smaller than the amount (R1+[N−1]×R2), the control device determines that the replenishment condition is not satisfied. Thereafter, when the total consumption C becomes equal to or larger than the amount (R1+[N−1]×R2), the control device determines that the replenishment condition is satisfied afterward.

Figure 10:
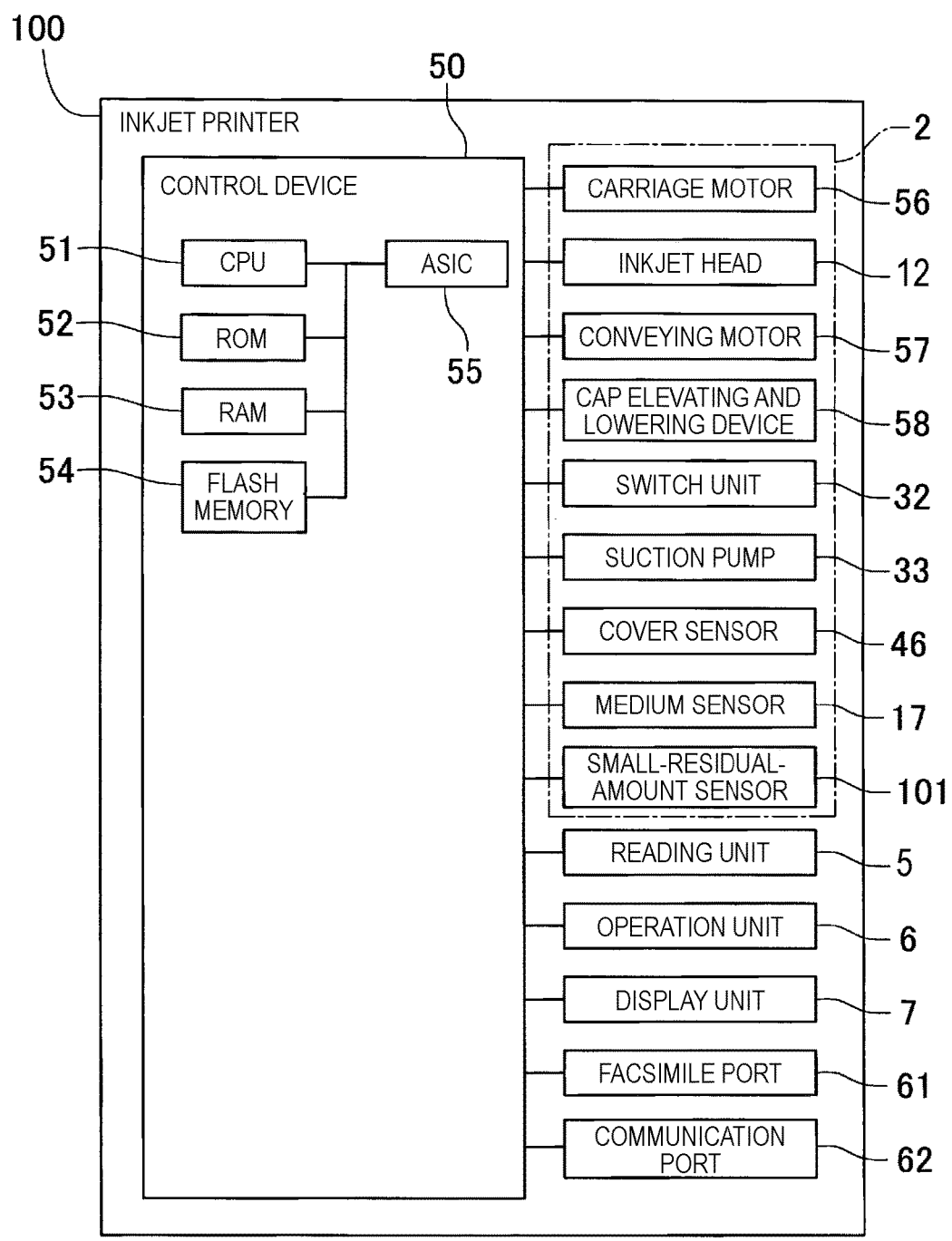
FIG. 10 is a block diagram illustrating the electrical configuration of an inkjet printer of a second modification.

In the above-described aspect, whether the replenishment condition is satisfied is determined on the basis of the total consumption C; however, the present disclosure is not limited thereto. In a second modification, as shown in FIG. 10, an inkjet printer 100 includes a small-residual-amount sensor 101 for detecting that the residual amount of black ink contained in the ink tank 13a is in a small remaining state where the residual amount is equal to or smaller than a predetermined small residual amount. The small-residual-amount sensor 101 is installed in the vicinity of the ink tank 13a, for example, on the tank storage unit 26 (see FIG. 1). The small-residual-amount sensor 101 is, for example, a sensor which has a light emitter and a photo-receiver for receiving light radiated from the light emitter and in which according to whether the residual amount of black ink contained in the ink tank 13a is equal to or smaller than the predetermined small residual amount, the amount of light which is received by the photo-receiver varies. For the three ink tanks 13b, small-residual-amount sensors identical to that for the ink tank 13a are provided.

Figure 11:
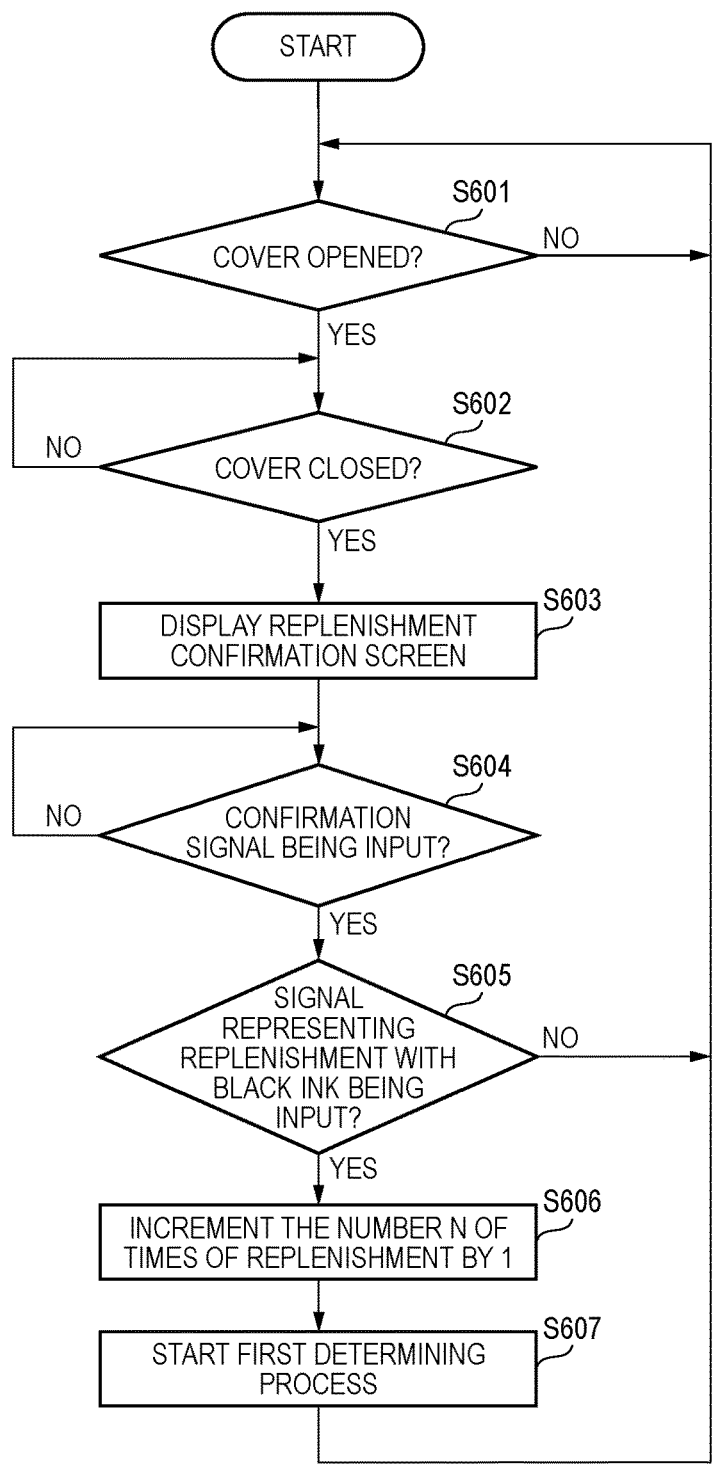
FIG. 11 is a flow chart illustrating the flow of processing for counting completion of ink replenishment and the number of times of replenishment.

In the second aspect, the control device 50 performs detection of completion of replenishment of black ink and other processing by performing processing according to the flow of FIG. 11. More specifically, the control device 50 waits for the cover 45 to be opened, on the basis of the result of detection of the cover sensor 46 ("NO" in step S600). When the cover 45 is opened ("YES" in step S601), the control device waits for the cover 45 to be closed, on the basis of the result of detection of the cover sensor 46 ("NO" in step S602). When the cover 45 is closed ("YES" in step S602), the control device controls the display unit 7 such that the display unit displays an replenishment confirmation screen for receiving a user's confirmation input about whether the user added ink and receiving a user's input about what color of ink the use added in the case where the user added ink (step S603). The control device waits until a confirmation signal based on an operation performed on the operation unit 6 (an input unit of the present disclosure) according to the display of the confirmation screen by the user is input ("NO" in step S604), and when a confirmation signal is input by the user ("YES" in step S604), on the basis of the input signal, the control device determines whether black ink has been added (step S605).

In the case where a signal representing that replenishment of ink has not been performed, or a signal representing that color ink has been added ("NO" in step S605), the control device returns to step S601. When a signal representing that black ink has been added (a replenishment completed signal of the present disclosure) is input ("YES" in step S605), the control device updates the number N of times of replenishment of black ink stored in the flash memory 54 with (N+1) (step S606). In the second modification, information on the number N of times of replenishment of black ink stored in the flash memory 54 corresponds to replenishment count information of the present disclosure. After starting the first determining process (step S607), the control device returns to step S601.

Figure 12:
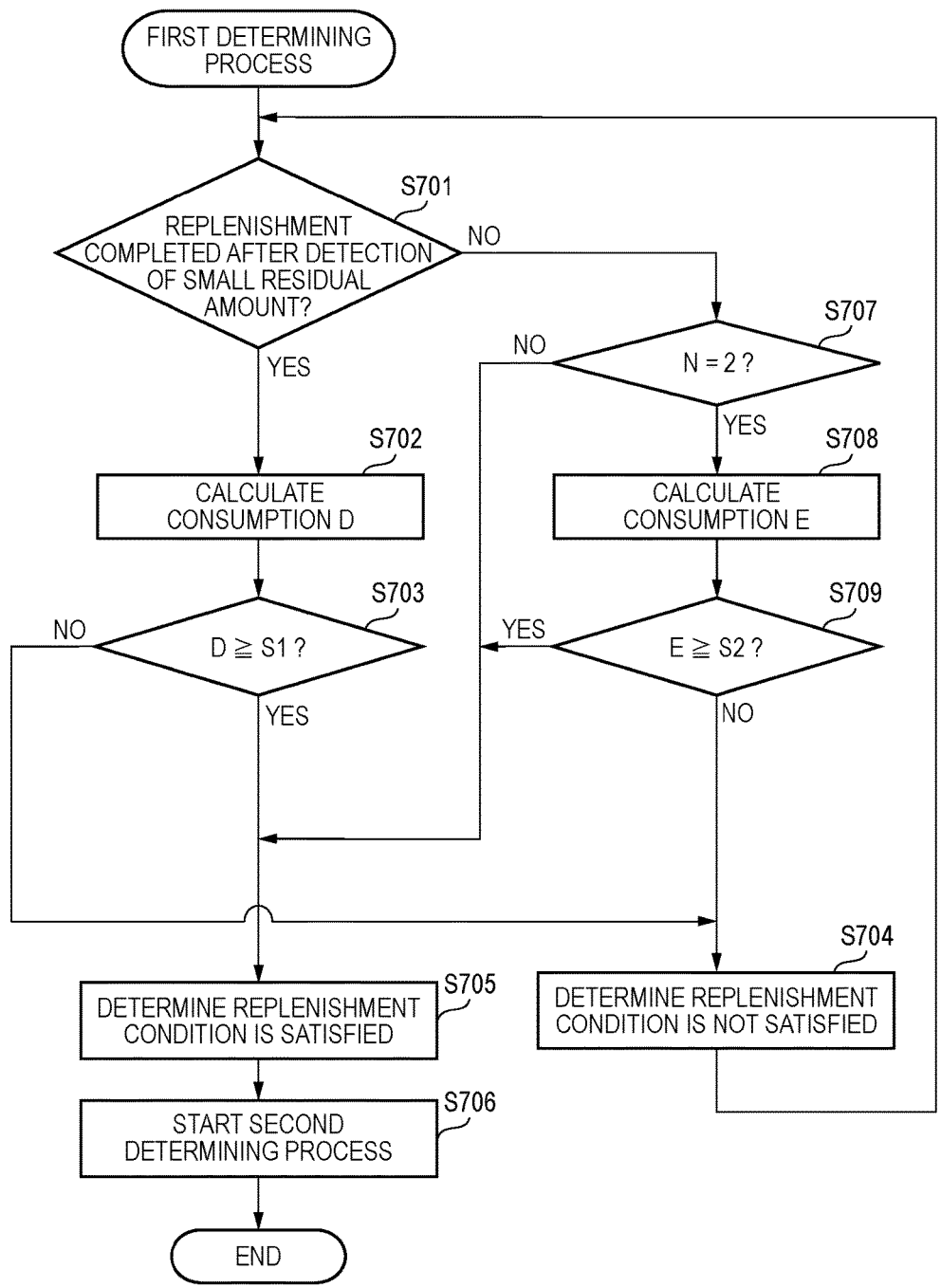
FIG. 12 is a flow chart illustrating the flow of a first determining process of the second modification.

During the first determining process of the second modification, as shown in FIG. 12, after the small-residual-amount sensor 101 detects that the residual amount is in the small remaining state, the control device 50 determines whether completion of replenishment of the ink tank 13a with black ink has been detected (i.e. whether the result of step S605 has become "YES") (step S701). After the small-residual-amount sensor 101 detects that the residual amount is in the small remaining state, when completion of replenishment of the ink tank 13a with black ink is detected ("YES" in step S701), the control device 50 calculates the consumption D of black ink consumed from the inkjet head 12 since the small-residual-amount sensor 101 detected that the residual amount was in the small remaining state (step S702). When the consumption D is smaller than a predetermined first threshold S1 ("NO" in step S703), the control device determines that the replenishment condition is not satisfied (step S704), and returns to step S701. Meanwhile, when the consumption D is equal to or larger than the predetermined first threshold S1 ("YES" in step S703), the control device determines that the replenishment condition is satisfied (step S705), and starts the second determining process, and finishes the processing. Here, the first threshold S1 is an amount equal to or smaller than the above-mentioned small residual amount.

Meanwhile, in the case where completion of replenishment of the ink tank 13a with black ink is detected before the small-residual-amount sensor 101 detects that the residual amount is in the small remaining state ("NO" in step S701), when the number N of times of replenishment is 2 ("YES" in step S707), the control device 50 calculates the consumption E of black ink consumed from the inkjet head 12 since the previous replenishment of the ink tank 13a with black ink was completed (step S708). When the consumption E is smaller than a predetermined second threshold S2 ("NO" in step S709), the control device determines that the replenishment condition is not satisfied (step S704), and returns to step S701. Meanwhile, when the consumption E is equal to or larger than the predetermined second threshold S2 ("YES" in step S709), the control device determines that the replenishment condition is satisfied (step S705), and starts the second determining process is started (step S706), and then finishes the processing. Here, the second threshold S2 is an amount equal to or smaller than the maximum storage amount R1.

Meanwhile, when the number N of times of replenishment is 3 or greater ("NO" in step S707), the control device determines that the replenishment condition is satisfied (step S705), and starts the second determining process (step S706), and finishes the processing. Therefore, in the case where the number N of times of replenishment is 3 or greater, when replenishment of the ink tank 13a with black ink is completed before it is detected that the residual amount is in the small remaining state, the control device determines that the replenishment condition is satisfied afterward.

Figure 13:
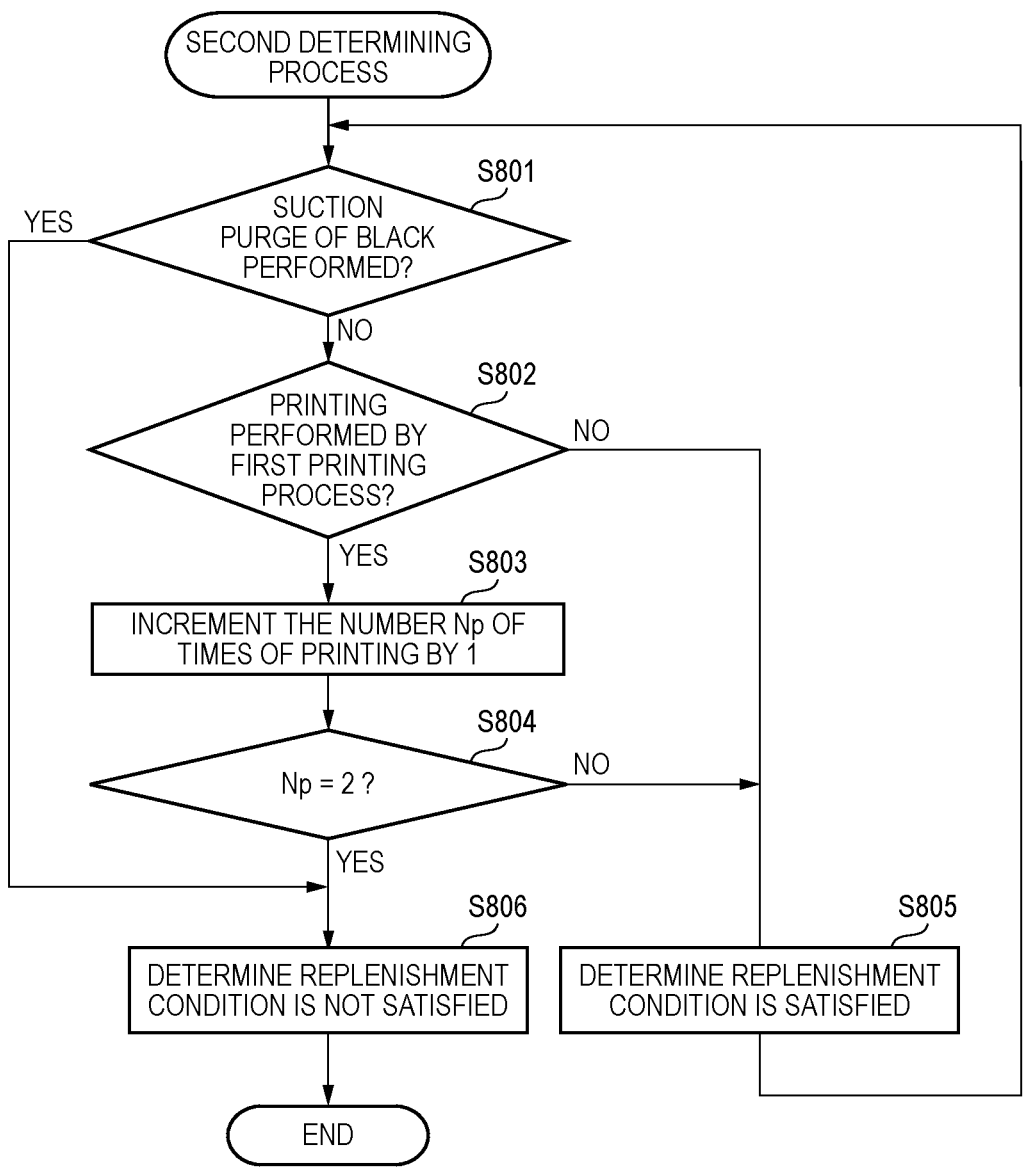
FIG. 13 is a flow chart illustrating the flow of a second determining process of the second modification.

During the second determining process of the second modification, as shown in FIG. 13, the control device performs processes of step S S801 to S806 identical to steps S S401 to S406 of the above-described aspect. However, in the second modification, unlike the above-described aspect, when determining in step S805 that the replenishment condition is satisfied, the control device returns to step S801. When determining in step S806 that the replenishment condition is not satisfied, the control device finishes the processing.

When the ink tank 13a becomes the small remaining state, the ink tank is replenished with ink. Then, when the black ink contained in the ink tank 13a flocculates, when the amount of ink consumed from the nozzles 10a since the residual amount became the small remaining state reaches a predetermined amount, the flocculated black ink reaches the inkjet head 12, and thus it becomes impossible to eject black ink from the nozzles 10a. Since the predetermined amount is an amount corresponding to the above-mentioned small residual amount, it can be estimated with some degree of accuracy. Therefore, in the second modification, after it is detected that the ink tank 13a is in the small remaining state, when replenishment of the ink tank with ink is completed, the control device calculates the consumption D of ink consumed from the nozzles 10a since it was detected that the residual amount was in the small remaining state. Further, when the consumption D is smaller than the first threshold S, the control device determines that the replenishment condition is not satisfied; whereas when the consumption D is equal to or larger than the first threshold S1, the control device determines that the replenishment condition is satisfied.

Meanwhile, in the case where black ink is added to the ink tank 13a before it is detected that the ink tank is in the small remaining state, since the residual amount of black ink contained in the ink tank 13a just before the replenishment with black ink cannot be grasped, it is impossible to perform such estimation.

Here, it is assumed that when ink is added to the ink tank 13a for the first time (before the first use of the inkjet printer 1), ink is added until the amount of ink contained in the first tank reaches the maximum storage amount R1. Therefore, in the case where the number N of times of replenishment is 2, when black ink is added to the ink tank 13a before it is detected that the residual amount is in the small remaining state, the control device calculates the consumption E of ink consumed from the nozzles 10a since the previous (first) replenishment of the ink tank 13a with black ink. Further, when the consumption E is smaller than the second threshold S2, the control device determines that the replenishment condition is not satisfied; whereas when the consumption E is equal to or larger than the second threshold S2, the control device determines that the replenishment condition is satisfied.

In contrast, except for the first replenishment, when black ink is added to the ink tank 13a, the possibility that ink is not added until the amount of ink contained in the ink tank 13a becomes the maximum storage amount R1 is high. For this reason, in the case where the number N of times of replenishment is 3 or greater, when black ink is added to the ink tank 13a before it is detected that the residual amount is in the small remaining state, the control device determines that the replenishment condition is satisfied. Therefore, when black ink contained in the inkjet head 12 is actually in the flocculated state, it is always possible to determine that the replenishment condition is satisfied. However, in this case, when black ink contained in the inkjet head 12 is not in the flocculated state, it may take a long time until it is determined that the replenishment condition is satisfied.

In the second modification, on the assumption that whenever ink is added to the ink tank 13a, ink is added until the amount of ink reaches the maximum storage amount R1, even in the case where the number N of times of replenishment is 3 or greater, similarly to the case where the number N of times of replenishment is 2, the control device may determine whether the replenishment condition is satisfied, on the basis of the consumption E.

The method of determining whether black ink is ejected from the nozzles 10a in the case where the first printing process is performed after it is determined that the replenishment condition is satisfied is not limited to that of the above-described aspect.

Figure 14:
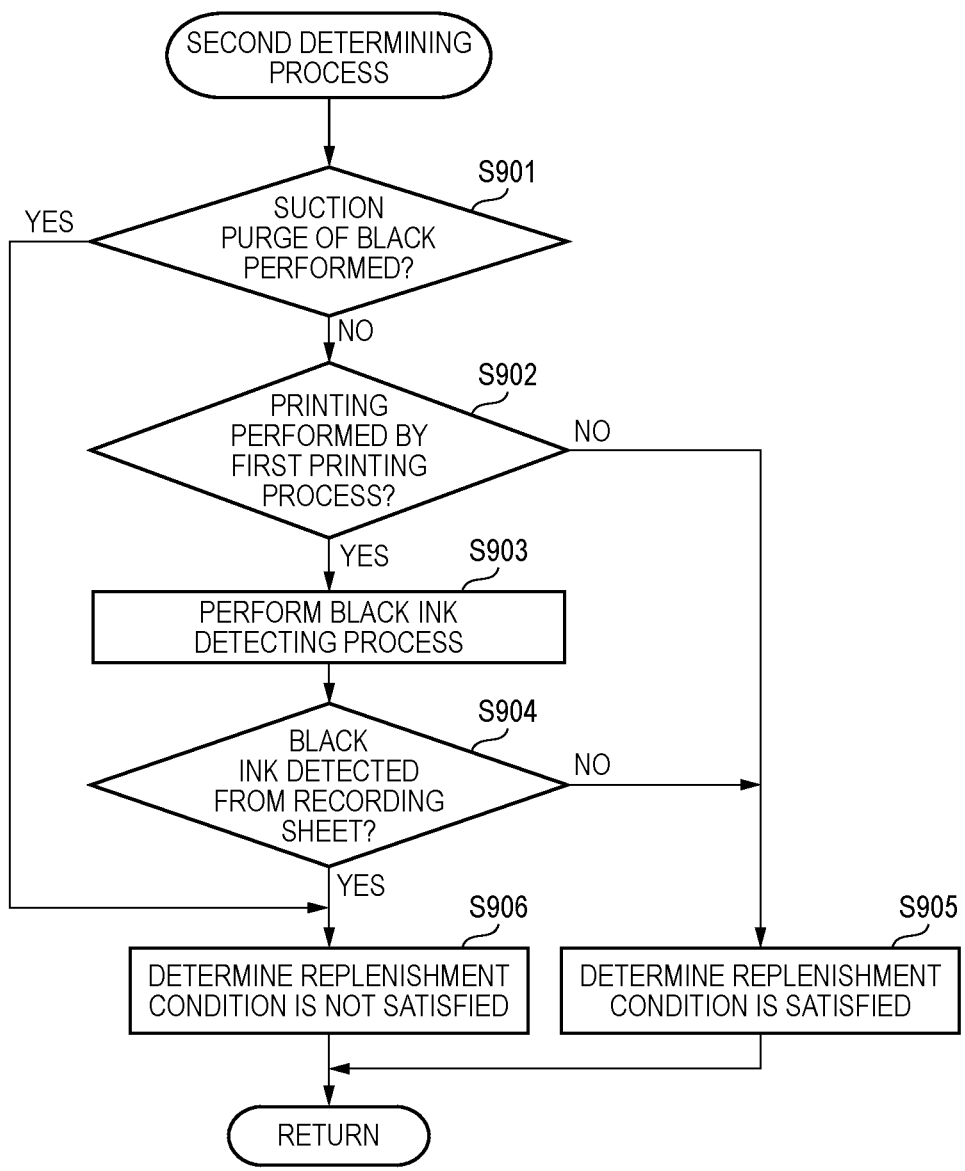
FIG. 14 is a flow chart illustrating the flow of a second determining process of a third modification.

For example, in a third modification, similarly to the above-described aspect, the control device 50 determines whether the replenishment condition is satisfied by performing processing according to the flow shown in FIG. 6. However, the third modification is different from the above-described aspect in the second determining process. In the third modification, during the second determining process, as shown in FIG. 14, in the case where suction purge of black has not been performed ("NO" in step S901), and printing also has not been performed by the first printing process ("NO" in step S902), the control device 50 determines that the replenishment condition is satisfied (step S905). Meanwhile, in the case where suction purge of black has not been performed ("NO" in step S901), but printing has been performed by the first printing process ("YES" in step S902), the control device 50 performs a black ink detecting process for controlling the medium sensor 17 such that the medium sensor 17 detects black ink on recording sheets P having images recorded thereon (step S903).

During the black ink detecting process, for example, the control device controls the display unit 7 such that the display unit displays a message, and controls the feeding unit 3 such that the feeding unit supplies printed recording sheets P to the user. Further, the control device performs control such that printed recording sheets P are conveyed while the light emitter 17a of the medium sensor 17 radiates light toward the printed recording sheets P. In the case where there is black ink in a recording sheet P, as compared to the case where there is no black ink, light is unlikely to be reflected from the recording sheet P, and thus a smaller amount of light is detected by the photo-receiver 17b. For this reason, during the black ink detecting process, in the case where the amount of light detected by the photo-receiver 17b is smaller than a predetermined threshold, the medium sensor 17 detects that there is black ink on a corresponding medium P.

Meanwhile, when black ink is not detected from a recording sheet P by the medium sensor 17 ("NO" in step S904), the control device determines that the replenishment condition is satisfied (step S905). Meanwhile, in the case where black ink is detected from a recording sheet P by the medium sensor 17 ("YES" in step S904), the control device determines that the replenishment condition is not satisfied (step S906). Even in the third modification, similarly to the above-described aspect, in the case where suction purge of black has been performed ("YES" in step S901), the control device determines that the replenishment condition is not satisfied (step S906).

When ink is added to the ink tank 13a, when ink having the same physical properties is added, black ink does not flocculate. Therefore, in this case, when printing is performed by the first printing process, black ink is ejected from the nozzles 10a, and the black ink lands on recording sheets P. Therefore, in the present aspect, in the state where it is determined that the replenishment condition is satisfied, when the first printing process is performed, the medium sensor 17 is used to detect whether there is black ink on recording sheets P. When it is determined that there is black ink on a recording sheet P, the control device determines that the replenishment condition is not satisfied afterward.

In the third modification, the medium sensor 17 for detecting the leading ends of recording sheets P is used to detect whether there is black ink on recording sheets P; however, the present disclosure is not limited thereto. For example, separately from the medium sensor 17, a dedicated sensor having a light emitter and a photo-receiver may be provided for detecting whether there is black ink on recording sheets P. In this case, when the dedicated sensor is installed at a position on the downstream side from the inkjet head 12 in the conveyance direction, it can detect whether there is black ink on recording sheets P just after printing.

Further, in the state where it is determined that the replenishment condition is satisfied, when the first printing process is performed, determination on whether black ink is normally ejected from the nozzles 10a may not be performed. For example, in the state where it is determined that the replenishment condition is satisfied, only in the case where suction purge of black is performed, the control device may determine that the replenishment condition is not satisfied afterward.

Figure 15:
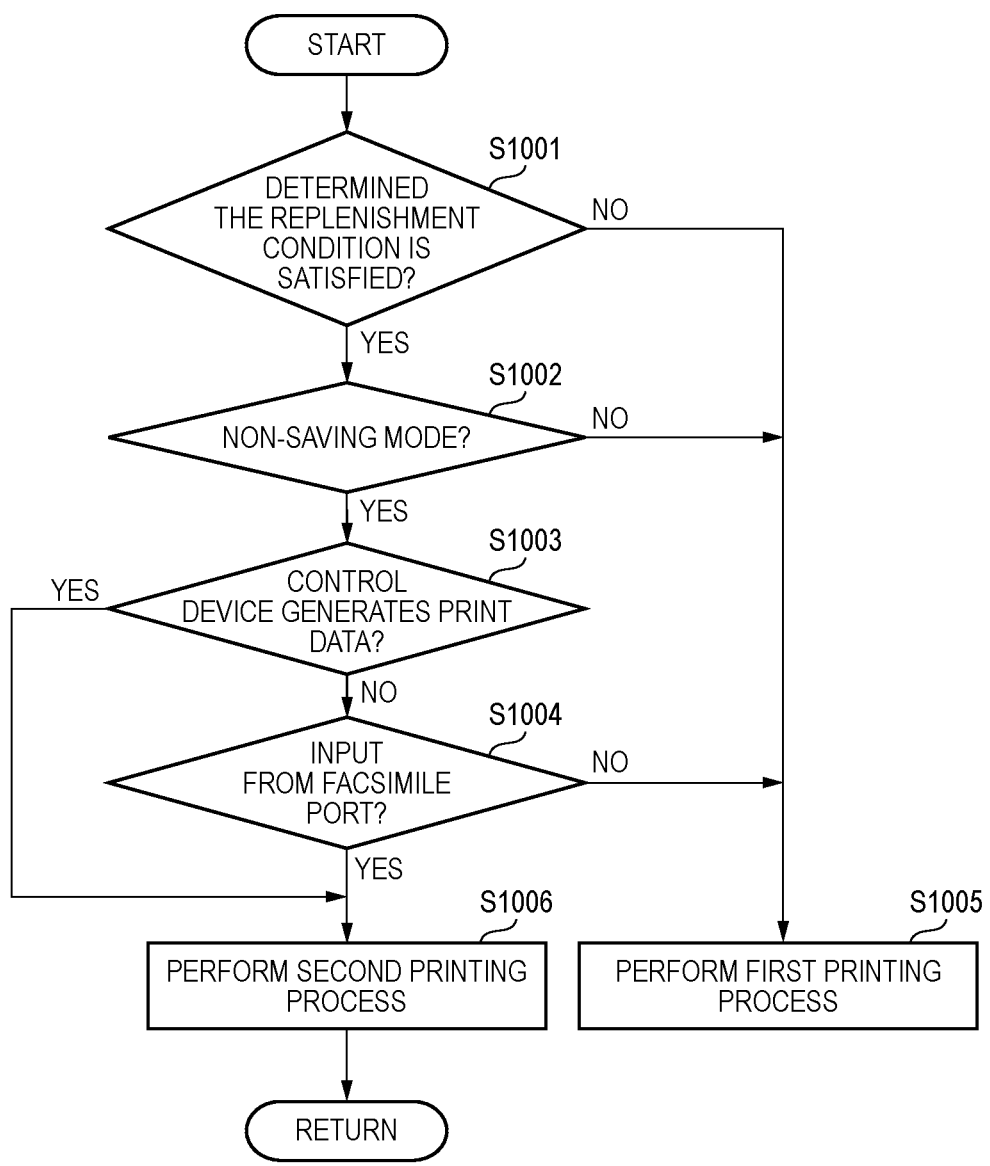
FIG. 15 is a flow chart illustrating the flow of processing according to a fourth modification which is performed during printing.

In the above-described aspect, on the basis of the data format of print data, whether the print data is print data input together with a user's printing instruction, or print data of a facsimile or a facsimile report is determined; however, the present disclosure is not limited thereto. For example, in a fourth modification, as shown in FIG. 15, instead of determination of step S103 of the above-described aspect, the control device determines whether the print data is print data generated by the control device 50, or print data input through the facsimile port 61, or print data input through the communication port 62 (step S1003 and step S1004).

Further, in the case of determining that the replenishment condition is not satisfied ("NO" in step S1001), when the inkjet printer is in the saving mode ("NO" in step S1002), and the print data is print data input through communication port 62 ("NO" in step S1003 and "NO" in step S1004), the control device 50 performs the first printing process such that the printing unit prints the images corresponding to the print data on recording sheets P (step S1005).

Meanwhile, in the case where it is determined that the replenishment condition is satisfied ("YES" in step S1001), and the inkjet printer is in the non-saving mode ("YES" in step S1002), and the print data is data generated by the control device 50 ("YES" in step S1003) or data input through the facsimile port 61 ("YES" in step S1004), the control device performs the second printing process such that the printing unit prints the images corresponding to the print data on recording sheets P (step S1005).

As described above, the control device 50 generates print data for printing a facsimile history and controls the printing unit 2 such that the printing unit prints the print data, for example, whenever a predetermined number of facsimiles are transmitted and received. Print data of facsimiles are input through the facsimile port 61. In contrast, print data including user's printing instructions are input through the communication port 62. Therefore, in the fourth modification, according to whether the print data is data input through the communication port 62, or data generated by the control device 50, or data input through the facsimile port 61, the control device determines whether the print data is print data input together with a user's printing instruction, or print data of a facsimile or a facsimile report.

In the aspect and the third modification described above, the control device determines whether the print data is print data of a facsimile or a facsimile report, or not; however, the present disclosure is not limited thereto. For example, in the above-described aspect, the control device may determine whether the data format of the print data is a predetermined data format different from the data format of facsimiles or facsimile reports, or not. In this case, when it is determined that the replenishment condition is satisfied, and the inkjet printer is in the non-saving mode, and the data format of the print data is the above-mentioned predetermined data format, the control device performs the second printing process such that the printing unit performs the images.

Alternatively, in the third modification, the inkjet printer 1 may have a first communication port (the first input unit of the present disclosure) for receiving print data by a first communication system different from facsimile communication, and a second communication port (the second input unit of the present disclosure) for receiving print data with a second communication system different from that of the first communication port, and determine which of the first and second communication ports print data was input from. In this case, when it is determined that the replenishment condition is satisfied, and the inkjet printer is in the non-saving mode, and print data is data input through the above-mentioned port with the first communication system, the control device performs the second printing process such that the printing unit prints images.

In these cases, the inkjet printer is not limited to a printer capable of performing facsimile communication, and the inkjet printer may not have a facsimile function.

The method of determining whether printing is printing according to a user's print command is not limited to those of the aspect and the fourth modification described above. For example, in a print command to be transmitted from the PC or the like to the inkjet printer 1, data representing that the print command is a user's print command may be included separately from print data. In this case, the control device may determine whether printing is printing according to a user's print command, according to whether data representing that the corresponding print command is a user's print command has been received.

Determination on which of the first printing process and the second printing process should be performed to perform control such that the printing unit performs printing in the case where the replenishment condition is satisfied is not limited to that described above.

For example, when the replenishment condition is satisfied, printing according to a user's print command may be performed by the second printing process. For example, after transmission of a print command to the inkjet printer, the user may delete data which is the source of print data from the PC or the like. In this case, when the inkjet printer performs monochrome printing, when the replenishment condition is satisfied, even though printing is printing according to a user's print command, the control device performs the second printing process such that the printing unit performs printing. Therefore, it is possible to prevent a failure from occurring in printing the images corresponding to the print data, and prevent re-printing from being impossible.

Alternatively, in the case where the replenishment condition is satisfied, even though the inkjet printer is in the saving mode, the control device may perform the second printing process such that the printing unit performs printing. In this case, the inkjet printer 1 may not be a printer selectively settable to one mode of the saving mode and the non-saving mode, and may be configured such that printed print data always are not saved and are deleted.

The method of determining whether the replenishment condition is satisfied is not limited to that described above. For example, similarly to the second modification, when the cover 45 is opened and then is closed, the control device may control the display unit 7 such that the display unit displays an replenishment confirmation screen, and when the user inputs a signal representing that he added black ink by operating the operation unit 6 according to that screen, the control device may determine that the replenishment condition is satisfied. Alternatively, covers may be provided for the ink tanks 13a and 13b, respectively, and when a cover corresponding to the ink tank 13a is opened and then closed, the control device may determine that the replenishment condition is satisfied.

Although the case where the present disclosure is applied to the ink tanks 13a and 13b to which ink can be added from the replenishment inlets 42b has been described, the present disclosure is not limited thereto. The present disclosure can also be applied to an inkjet printer having removable ink cartridges. In this case, when an ink cartridge is replaced, ink is added to a passage for connecting an ink cartridge and nozzles.

When replacing an ink cartridge, a user may install an ink cartridge containing black ink having different physical properties from those of black ink contained in the ink cartridges having been installed before, by mistake. Even in this case, the ink having different physical properties intermixes. Therefore, the black ink may flocculate. Therefore, even in the case, as described above, when the printer performs monochrome printing, for example, in the case where the replenishment condition is satisfied, the control device may perform the second printing process such that the printing unit performs printing. According to this configuration, it is possible to print images corresponding to print data with ink different from ink corresponding to the print data. In this case, for example, when an ink cartridge is replaced, the control device determines that the replenishment condition is satisfied.

In the above-described aspect, during the second ejecting operation, from all of the nozzles 10a and 10b, ink is ejected; however, the present disclosure is not limited thereto. During the second ejecting operation, the inkjet head may eject color ink from the nozzles 10b without ejecting black ink from the nozzles 10a. In this case, regardless of whether black ink contained in the inkjet head 12 is in the flocculated state, black ink is not ejected from the nozzles 10a. Therefore, it is unnecessary to reduce the ejection amount of ink from the nozzles 10b in case ink is ejected from the nozzles 10a. Therefore, it is possible to set the ejection amount of ink from the nozzles 10b to such an amount that printed images can be visually recognized.

In this case, from the nozzles 10b, ink of three colors, i.e. yellow, cyan, and magenta is ejected such that the ink lands while overlapping. However, of the ink of three colors, ink of two colors may be ejected such that the ink lands while overlapping. Alternatively, from the nozzles 10b, only ink of one color may be ejected.

In the above-described aspect, flocculated ink contained in the inkjet head 12 is discharged from the nozzles 10a and 10b by suction purge; however, the present disclosure is not limited thereto. For example, on the passages such as the tubes 23 between the ink tanks 13a and 13b and the inkjet head 12, a pump for transferring ink may be provided, such that it is possible to perform pressure purging for discharging flocculated ink contained in the inkjet head 12 from the nozzles 10a and 10b by driving the pump. In this case, the pump corresponds to the discharging unit of the present disclosure. Alternatively, the inkjet printer may be configured such that it can perform both of suction purge and pressure purging to discharge flocculated ink contained in the inkjet head 12 from the nozzles 10a and 10b. In this case, a combination of the maintenance unit 18 and the pump provided on the tubes 23 or the like corresponds to the discharging unit of the present invention. Alternatively, the inkjet head 12 may be driven to perform flushing for ejecting ink from the nozzles 10a and 10b, thereby discharging flocculated ink contained in the inkjet head 12. In this case, during flushing, the inkjet head 12 is driven such that, as compared to when printing is performed, larger ejection energy is given to ink contained in the nozzles 10a and 10b, thereby capable of discharging flocculated ink contained in the inkjet head 12. In this case, the inkjet head 12 doubles as the discharging unit of the present invention.

In the above-mentioned example, the inkjet printer has the so-called serial type inkjet head for ejecting ink from the nozzles 10a and 10b while moving together with the carriage 11 in the scanning direction; however, the present invention is not limited thereto. The inkjet printer may be a printer having a so-called line head extending over the entire length of a recording sheet P in a scanning direction. In this case, for example, the inkjet printer may have one line head for ejecting ink of four colors. In this case, the one line head corresponds to an inkjet head of the present invention. Alternatively, the inkjet printer may have a plurality of line heads configured to eject only ink of some colors of inks of the four colors and arranged side by side in the conveyance direction. In this case, the combination of the plurality of line heads corresponds to the inkjet head of the present invention.

Although the case where the first ink is black ink and the second ink is a color ink has been described as an example, the first ink and the second ink may be other types of ink different from each other.

What is claimed is:

1. An inkjet printer comprising:
an inkjet head having a first nozzle for ejecting first ink supplied from a first tank and a second nozzle for ejecting second ink different from the first ink, the second ink supplied from a second tank;
a first passage that fluidly connects the first nozzle and the first tank;
a second passage that fluidly connects the second nozzle and the second tank; and
a controller,
wherein the controller is configured to:
determine whether a replenishment condition related to replenishment of at least one of the first tank and the first passage with ink having physical properties different from those of the first ink is satisfied;
when print data instructing to print with the first ink is received, in a case of determining that the replenishment condition is not satisfied, cause the inkjet head to perform a first ejecting operation of ejecting ink from the first nozzle toward a medium and prohibiting ejection of ink from the second nozzle toward the medium; and
when print data instructing to print with the first ink is received, in a case of determining that the replenishment condition is satisfied, cause the inkjet head to perform a second ejecting operation of ejecting ink from at least the second nozzle toward a medium.

2. The inkjet printer according to claim 1,
wherein the controller determines whether there is a possibility that the first ink contained in the inkjet head is in a flocculated state, by determining whether the replenishment condition is satisfied.

3. The inkjet printer according to claim 1,
wherein the print data instructing to print with the first ink is print data of a facsimile or a report related to facsimiles.

4. The inkjet printer according to claim 1,
wherein the controller is configured to:
when print data instructing to print with the first ink is received, in a case where determining that the replenishment condition is satisfied and a data format of the print data is a predetermined data format, cause the inkjet head to perform the second ejecting operation; and
when print data instructing to print with the first ink is received, in a case where determining that the replenishment condition is satisfied and the data format of the print data is different from the predetermined data format, cause the inkjet head to perform the first ejecting operation.

5. The inkjet printer according to claim 1, further comprising:
a first input unit to which print data instructing to print with the first ink is input with a first communication system; and
a second input unit to which print data instructing to print with the first ink is input with a second communication system different from the first communication system,
wherein the controller is configured to:
when print data instructing to print with the first ink is received, in a case where determining that the replenishment condition is satisfied and the received print data is data input through the first input unit, cause the inkjet head to perform the second ejecting operation; and
when print data instructing to print with the first ink is received, in a case where determining that the replenishment condition is satisfied and the received print data is data input through the second input unit, cause the inkjet head to perform the first ejecting operation.

6. The inkjet printer according to claim 1,
wherein the controller is configured to:
when print data instructing to print with the first ink is received, in a case where determining that the replenishment condition is satisfied and a printing is not performed according to an instruction by a user of the inkjet printer, cause the inkjet head to perform the second ejecting operation, and
when print data instructing to print with the first ink is received, in a case where determining that the replenishment condition is satisfied and the printing is performed according to an instruction by the use of the inkjet printer, cause the inkjet head to perform the first ejecting operation.

7. The inkjet printer according to claim 1, further comprising a memory configured to store information relating to a maximum storage amount that is a maximum ink storage amount of the first tank,
wherein the first tank has an ink replenishment inlet, and the controller is configured to:
calculate a total consumption of ink consumed from the first nozzle of the inkjet head;
in a case where the total consumption is smaller than the maximum storage amount, determine that the replenishment condition is not satisfied; and
in a case where the total consumption is equal to or larger than the maximum storage amount, determine that the replenishment condition is satisfied.

8. The inkjet printer according to claim 1, further comprising a discharging unit configured to discharge ink contained in the inkjet head,
wherein when the controller causes the inkjet head to perform the first ejecting operation in a state that the controller determines that the replenishment condition is satisfied, and the controller subsequently causes the inkjet head to perform a next first ejecting operation without discharging ink from the first nozzle by the discharging unit, the controller is configured to determine that the replenishment condition is not satisfied afterward.

9. The inkjet printer according to claim 1, further comprising:
a light emitter configured to radiate light toward a medium; and
a photo-receiver configured to receive light radiated from the light emitter, wherein the controller is configured to:
when causing the inkjet head to perform the first ejecting operation in a state that the controller determines that the replenishment condition is satisfied, cause the light emitter to irradiate light on a printed medium, and detect whether there is the first ink on the medium based on a receiving amount of the photo-receiver; and
determine that the replenishment condition is not satisfied afterward in a case where detecting that there is the first ink on the medium.

10. The inkjet printer according to claim 1, further comprising a discharging unit configured to discharge ink contained in the inkjet head,
wherein when controller causes the discharging unit to discharge ink from the first nozzle in a state that the controller determines that the replenishment condition is satisfied, the controller is configured to determine that the replenishment condition is not satisfied afterward.

11. The inkjet printer according to claim 1, further comprising a memory configured to store information relating to a maximum storage amount that is a maximum ink storage amount of the first tank,
wherein the first tank has an ink replenishment inlet, and the controller is configured to:
calculate a total consumption of ink consumed from the first nozzle of the inkjet head; and
when determining that the replenishment condition is not satisfied in a state that the total consumption is equal to or larger than ([N−1]×R1) and is smaller than (N×R1), in a case where the total consumption thereafter becomes equal to or larger than (N×R1), determine that the replenishment condition is satisfied afterward, wherein the parameter "R1" is the maximum storage amount and the parameter "N" is an integer of 2 or greater.

12. The inkjet printer according to claim 8, further comprising a memory configured to store information relating to a maximum storage amount that is a maximum ink storage amount of the first tank, and information relating to an ink filling amount of a unused ink bottle filled with ink supplied in the first tank,
wherein the first tank has an ink replenishment inlet,
the ink filling amount is equal to or smaller than the maximum storage amount, and
the controller is configured to:
calculate a total consumption of ink consumed from the first nozzle of the inkjet head; and
when determining that the replenishment condition is not satisfied in a state that the total consumption is equal to or larger than (R1+[N−2]×R2) and is smaller than (R1+[N−1]×R2), in a case where the total consumption thereafter becomes equal to or larger than (R1+[N−1]×R2), determine that the replenishment condition is satisfied afterward, wherein the parameter "R1" is the maximum storage amount, the parameter "R2" is the ink filling amount, and the parameter "N" is an integer of 2 or greater.

13. The inkjet printer according to claim 7, further comprising an input unit configured to input replenishment completed information related to completion of replenishment of the first tank with ink,
wherein the first tank has a replenishment inlet for the first ink,
the controller is configured to:
when the replenishment completed information is input by the input unit after detecting that it is in a small remaining state that a residual amount of ink of the first tank is equal to or smaller than a predetermined small residual amount,
calculate a consumption of ink consumed from the first nozzle of the inkjet head since it is detected that the residual amount of ink of the first tank is in the small remaining state:
in a case where the calculated ink consumption is smaller than a first threshold equal to or smaller than the small residual amount, determine that the replenishment condition is not satisfied; and
in a case where the calculated ink consumption is equal to or larger than the first threshold, determine that the replenishment condition is satisfied, and
the controller is configured to:
when the replenishment completed information is input by the input unit before the residual amount of ink of the first tank becomes the small remaining state,
calculate a consumption of ink consumed from the first nozzle of the inkjet head since the previous replenishment of the first tank with ink is completed;
in a case where the calculated ink consumption is smaller than a second threshold equal to or smaller than the maximum storage amount that is the maximum ink storage amount of the first tank, determine that the replenishment condition is not satisfied; and
in a case where the calculated ink consumption is equal to or larger than the second threshold, determine that the replenishment condition is satisfied.

14. The inkjet printer according to claim 13, further comprising a memory configured to store replenishment count information related to the number of times of replenishment of the first tank with the first ink,
wherein the controller is configured to update the replenishment count information stored in the memory whenever the replenishment completed information is input by the input unit,
wherein in a case where the number of times of replenishment represented by the replenishment count information is 2,
when the replenishment completed information is input by the input unit before the residual amount of ink of the first tank becomes the small remaining state, the controller is configured to:
calculate the consumption of ink consumed from the first nozzle of the inkjet head since the previous replenishment of the first tank with ink is completed;
in a case where the calculated ink consumption is smaller than the second threshold, determine that the replenishment condition is not satisfied; and
in a case where the calculated ink consumption is equal to or larger than the second threshold, determine that the replenishment condition is satisfied, and
wherein in a case where the number of times of replenishment represented by the replenishment count information is equal to or larger than 3,
when the replenishment completed information is input by the input unit before the residual amount of ink of the first tank becomes the small remaining state, the controller is configured to determine that the addition condition is satisfied.

15. The inkjet printer according to claim 1,
wherein the controller is configured to cause the inkjet head to eject ink from both of the first nozzle and the second nozzle when the controller cause the inkjet head to perform the second ejecting operation.

16. The inkjet printer according to claim 1,
wherein the inkjet head includes a plurality of the first nozzles and a plurality of the second nozzles, and
when the controller causes the inkjet head to perform the second ejecting operation, the controller performs an assignment of use of the plurality of the first nozzles and the plurality of the second nozzles corresponding to the received print data such that a frequency of ejecting ink toward a medium from the plurality of the second nozzles is higher than a frequency of ejecting ink toward the medium from the plurality of the first nozzles.

17. The inkjet printer according to claim 1,
wherein when the controller causes the inkjet head to perform the second ejecting operation, the controller causes the second nozzle to eject ink and prohibits ejection of ink from the first nozzle.

18. The inkjet printer according to claim 1, further comprising a memory configured to save print data,
wherein the controller is configure to:
selectively set the inkjet printer to one mode of a saving mode where print data is saved in the memory and a non-saving mode where print data is not save in the memory;
in a case where the replenishment condition is satisfied and the inkjet printer is set to the non-saving mode when print data instructing to print with the first ink is received, cause the inkjet head to perform the second ejecting operation; and
in a case where the replenishment condition is satisfied and the inkjet printer is set to the saving mode, cause the inkjet head to perform the first ejecting operation.

19. The inkjet printer according to claim 1,
wherein the controller is configured to:
when print data instructing to print with the first ink is received, in a case of determining that the replenishment condition is not satisfied at a moment just before or just after receiving the print data, cause the inkjet head to perform the first ejecting operation; and
when print data instructing to print with the first ink is received, in a case of determining that the replenishment condition is satisfied at a moment just before or just after receiving the print data, cause the inkjet head to perform the second ejecting operation.

* * * * *